US012508803B2

(12) United States Patent
Kondo et al.

(10) Patent No.: US 12,508,803 B2
(45) Date of Patent: Dec. 30, 2025

(54) PRINTING DEVICE AND PRINTING METHOD

(71) Applicant: SEIKO EPSON CORPORATION, Tokyo (JP)

(72) Inventors: Takamitsu Kondo, Nagano (JP); Satoru Kobayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 182 days.

(21) Appl. No.: 18/507,133

(22) Filed: Nov. 13, 2023

(65) Prior Publication Data

US 2024/0157696 A1 May 16, 2024

(30) Foreign Application Priority Data

Nov. 14, 2022 (JP) ................................ 2022-181648

(51) Int. Cl.
*B41J 2/045* (2006.01)

(52) U.S. Cl.
CPC ......... *B41J 2/0451* (2013.01); *B41J 2/04581* (2013.01)

(58) Field of Classification Search
CPC .. B41J 2/0451; B41J 2/04581; B41J 2/16585; B41J 3/4078; B41J 2/16579; B41J 2/2114; B41J 2/2132; B41J 2/2146; B41J 2/145; B41M 5/00
USPC ........................................................... 347/14
See application file for complete search history.

(56) References Cited

U.S. PATENT DOCUMENTS

| | | | | |
|---|---|---|---|---|
| 8,899,710 | B2 | 12/2014 | Shinkawa et al. | |
| 2010/0026744 | A1* | 2/2010 | Jorba | B41J 2/2142 347/9 |
| 2010/0060682 | A1* | 3/2010 | Akatsuka | B41J 2/2117 347/9 |
| 2013/0257945 | A1 | 10/2013 | Shinkawa et al. | |
| 2021/0402758 | A1 | 12/2021 | Ohara | |

FOREIGN PATENT DOCUMENTS

| | | | |
|---|---|---|---|
| JP | 2013-230649 | A | 11/2013 |
| JP | 2022-011429 | A | 1/2022 |
| WO | 2008/104222 | A1 | 9/2008 |

* cited by examiner

*Primary Examiner* — Jason S Uhlenhake
*Assistant Examiner* — Alexander D Shenderov
(74) *Attorney, Agent, or Firm* — Global IP Counselors, LLP

(57) ABSTRACT

A print head has a first nozzle group that includes a plurality of first nozzles capable of ejecting a first liquid onto a medium, and a second nozzle group that includes a plurality of second nozzles ejecting a second liquid that is more visible than the first liquid onto the medium. A detection section is capable of detecting a first defective nozzle, which is ejection failure, from the first nozzle group without printing a test pattern indicating ejection state of each of the first nozzles on the medium. A control section causes a second nozzle test pattern indicating ejection state of each of the second nozzles to be printed on the medium using the second liquid, and information regarding the first defective nozzles detected by the detection section to be printed on the medium using the second liquid.

5 Claims, 14 Drawing Sheets

PRINTING DEVICE AND PRINTING METHOD

The present application is based on, and claims priority from JP Application Serial Number 2022-181648, filed Nov. 14, 2022, the disclosure of which is hereby incorporated by reference herein in its entirety.

BACKGROUND

1. Technical Field

The present disclosure relates to a printing device and a printing method for ejecting liquid from a print head.

2. Related Art

Inkjet printers, which eject droplets from an inkjet head toward a medium, are known as printing devices that eject liquid from a print head. The ink jet printers also include textile printing apparatuses that eject pigment ink or dye ink onto fabrics and the like. The inkjet head has nozzle arrays in which a plurality of nozzles is aligned. If the viscosity of the ink in the nozzles increases, air bubbles enter the nozzles, or dust or paper particles adhere to the nozzles, the droplets may not be ejected from the nozzles, or the droplets ejected from the nozzles may not land on correct positions on the medium. Here, nozzles that do not eject droplets properly are referred to as defective nozzles. When defective nozzles are present, dots are missing from print image, resulting in poor print quality.

JP-A-2022-11429 shows that a test pattern, which indicates an ejection state of each nozzle with ruled lines along the main-scanning direction, is printed on a print medium in order to inspect the ejection state of ink from the nozzle arrays.

For example, in a textile printing apparatus, a treatment liquid that agglomerates pigments contained in the ink may be ejected from the inkjet head. But the treatment liquid is transparent, so it is difficult to know information of defective nozzles by looking at the test pattern formed on the fabric and other materials. Also when the color of the liquid ejected from the inkjet head is similar to the color of the print medium, it is difficult to comprehend the information about defective nozzles by looking at the test pattern formed on the print medium. Therefore, it is desired that the information regarding the defective nozzles in a nozzle group that eject liquid that is hard to see, along with a test pattern of liquid that is easy to see, can be easily grasped by visual inspection of the printed object.

SUMMARY

The printing device of this disclosure includes a print head having a first nozzle group including a plurality of first nozzles configured to eject a first liquid onto a medium and a second nozzle group including a plurality of second nozzles configured to eject a second liquid, which is more visible than the first liquid, onto the medium; a control section that controls the ejection of the first liquid and the second liquid from the print head; and a detection section configured to detect a first defective nozzle, which is an ejection failure of the first nozzle group, without printing a test pattern indicating ejection state of each of the first nozzles on the medium, wherein the control section controls to print a second nozzle test pattern indicating ejection state of each of the second nozzles onto said medium with the second liquid, and to print information on the first defective nozzles detected by the detection section onto said medium with the second liquid.

A printing method of this disclosure is a printing method for printing by changing a relative positional relationship between a medium and a print head having a first nozzle group including a plurality of first nozzles that is configured to eject a first liquid onto the medium, and a second nozzle group including a plurality of second nozzles that is configured to eject a second liquid, which is more visible than the first liquid, onto the medium, the printing method includes: a detection step of detecting a first defective nozzle, which is an ejection failure of the first nozzle group, without printing a test pattern indicating ejection state of each of the first nozzles on the medium, a printing step of printing a second nozzle test pattern, which indicates ejection state of each of the second nozzles, to be printed on the medium by using the second liquid and of printing information regarding the first defective nozzle detected by the detection section to be printed on the medium by using the second liquid.

DESCRIPTION OF EMBODIMENTS

Hereinafter, embodiments of the present disclosure will be described. Of course, the following embodiments merely exemplify the present disclosure, and all of the features shown in the embodiments are not necessarily essential to the solutions in the present disclosure.

1. SUMMARY OF TECHNOLOGY INCLUDED IN THIS DISCLOSURE

First, an overview of technology included in this disclosure will be described with reference to examples illustrated in FIGS. 1 to 14. Note that the figures in this disclosure are schematic examples, and the scale of each part may differ from the actual scale in order to make each part of these figures large enough to be recognized, and the magnification in each direction shown in these figures may differ, and the figures may not be consistent. As a matter of course, each element of this technology is not limited to specific examples indicated by symbols. In the "Summary of technology included in this disclosure", descriptions in parentheses are supplementary explanations of the immediately preceding words.

First Aspect

Figure 1:
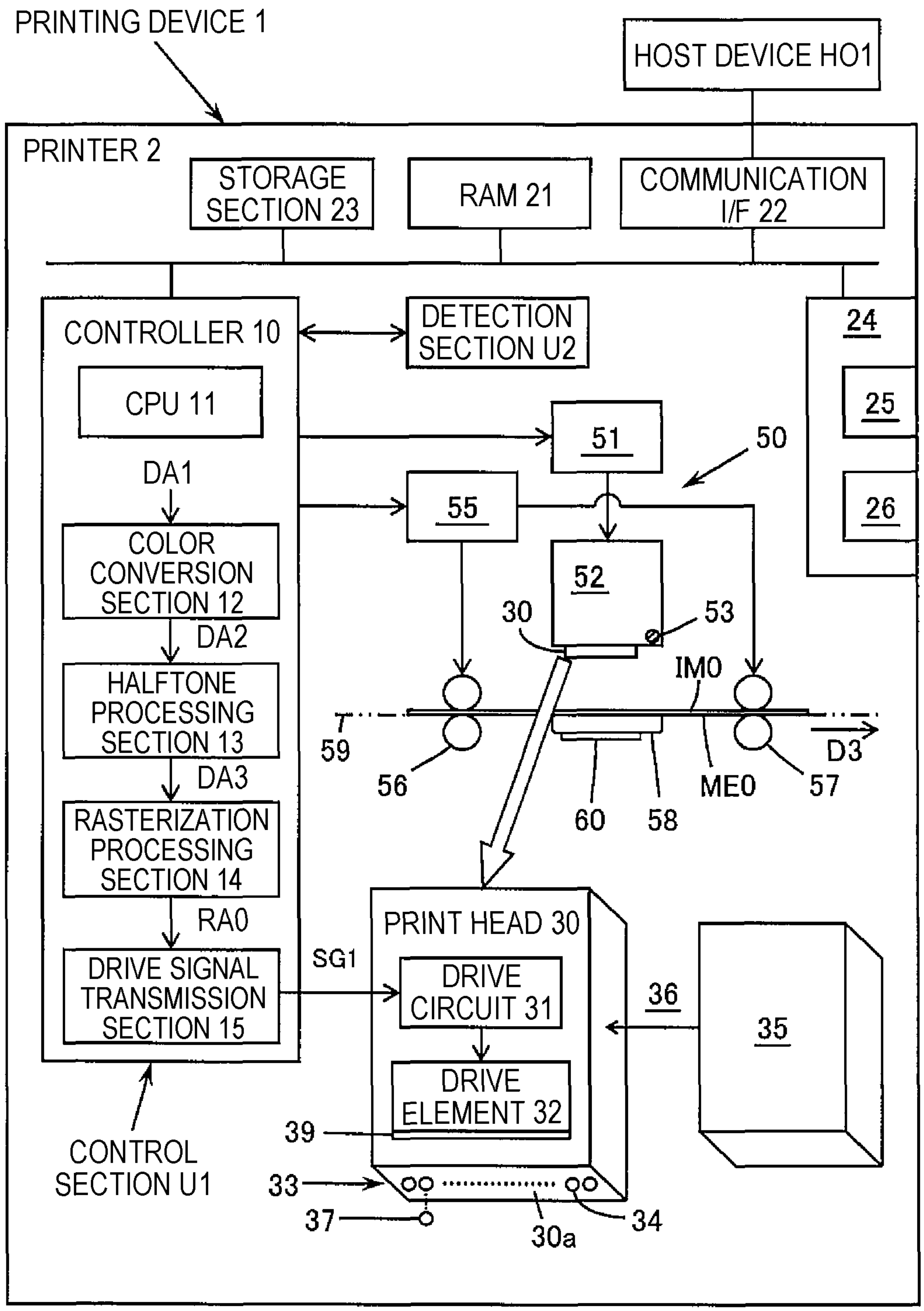
FIG. 1 is a schematic view of an example of a printing device.
Figure 2:
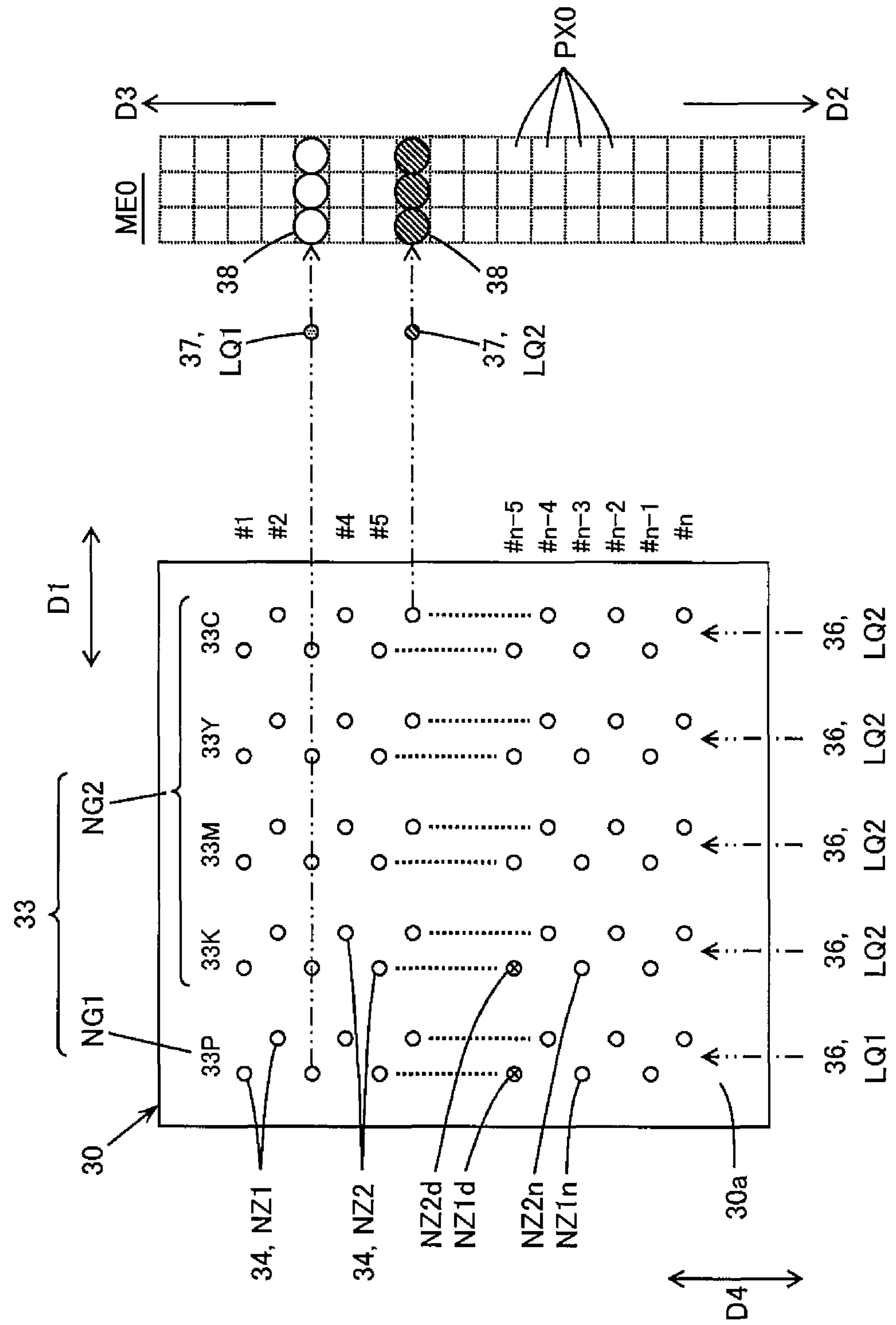
FIG. 2 is a schematic view of an example of a nozzle surface of a print head and a dot pattern on a medium.
Figure 6:
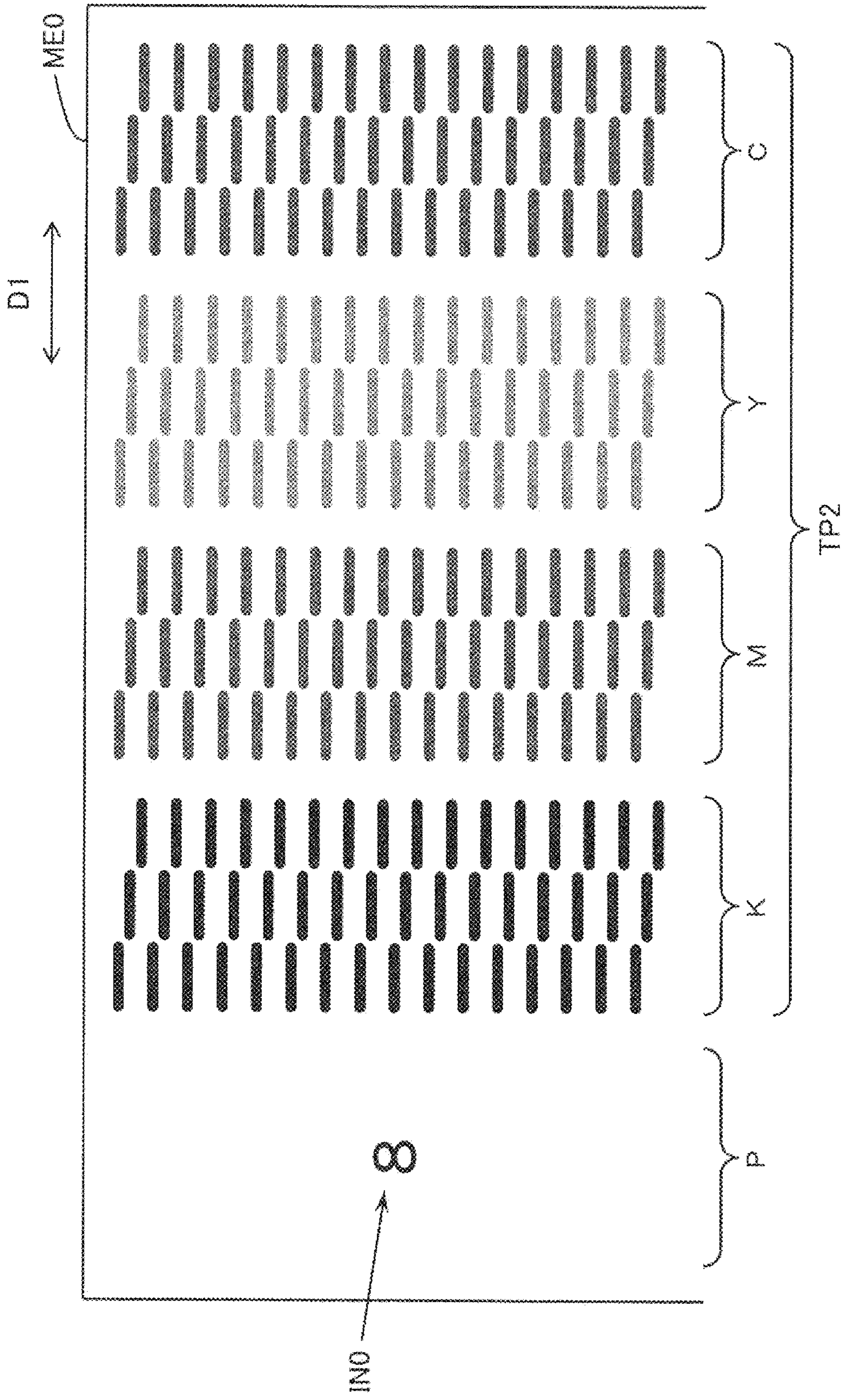
FIG. 6 is a schematic illustration of an example of a printed object including, along with a second nozzle test pattern, information regarding first defective nozzles in a first nozzle group, which can eject a first liquid with low visibility.
Figure 7:
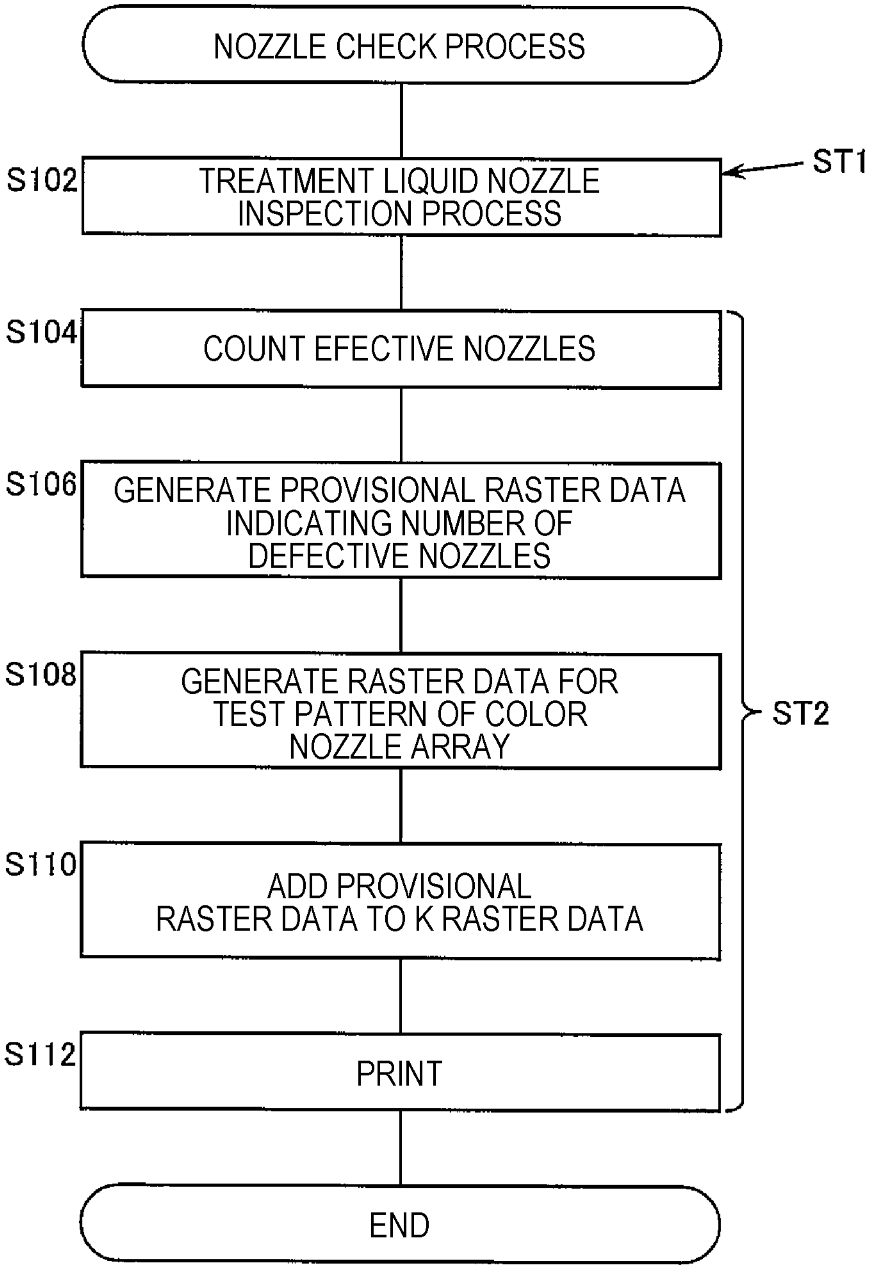
FIG. 7 is a flowchart schematically illustrating an example of nozzle check process.

As illustrated in FIG. 1, a printing device 1 according to an aspect of this technology is equipped with a print head 30, a drive section 50, a control section U1, and a detection section U2. As illustrated in FIG. 2, the print head 30 has a first nozzle group NG1 including a plurality of first nozzles NZ1 that can eject a first liquid LQ1 onto a medium ME0, and a second nozzle group NG2 including a plurality of second nozzles NZ2 that can eject a second liquid LQ2, which has higher visibility than does the first liquid LQ1, onto the medium ME0. The drive section 50 changes relative positional relationship between the print head 30 and the media ME0. The control section U1 controls ejection of the first liquid LQ1 and of the second liquid LQ2 from the print head 30 and controls change in their relative positional relationship by using the drive section 50. The detection section U2 can detect a first defective nozzle NZ1*d* that is an ejection failure in the first nozzle group NG1, without printing a test pattern showing ejection state of each of the first nozzles NZ1 on the medium ME0. As illustrated in FIGS. 6 and 7, the control section U1 controls printing of a second nozzle test pattern TP2, which indicates ejection state of each of the second nozzles NZ2, on the medium ME0 by using the second liquid LQ2, and printing information IN0 of the first defective nozzles NZ1*d*, which were detected by the detection section U2, on the medium ME0 by using the second liquid LQ2.

The second nozzle test pattern TP2, which indicates the ejection state of each of the second nozzles NZ2, is printed on the medium ME0 for each of the second nozzles NZ2 that can eject the second liquid LQ2, which is more visible than the first liquid LQ1. On the other hand, the first defective nozzle NZ1*d* included in the plurality of the first nozzles NZ1 is detected by the detection section U2. The information IN0 of the first defective nozzles NZ1*d* detected by the detection section U2 is printed on the medium ME0 by using the second liquid LQ2, which is more visible than the first liquid LQ1. By viewing the printed object, the user can know not only the test pattern indicating the ejection state of each nozzle that ejects easily visible liquid, but also the information IN0 regarding the defective nozzles included in the nozzle group that ejects liquid that is difficult to see in the test pattern. Therefore, the aspect described above can provide a printing device by which information regarding defective nozzles in a nozzle group that ejects liquid that is difficult to see in a test pattern, can be easily indicated on a printed object together with a test pattern of easily visible liquid.

Here, medium includes a variety of materials, such as fabric, paper, and film. In this application, "first", "second", and so on are terms for identifying each component included in multiple components having similarities, and do not mean an order. Which of the multiple components is assigned to the "first", "second", or . . . is determined relatively. For example, the first liquid and the second liquid are determined relative to each other. If the first liquid is transparent, the second liquid, which is more visible than the first liquid, encompasses opaque cyan, opaque magenta, opaque yellow, and opaque black. When the first liquid is yellow having a small difference in brightness from the basic color of the medium, the second liquid, which is more visible than the first liquid, includes cyan, magenta, black, and the like. Change in the relative positional relationship between the print head and the medium encompasses movement of the medium without movement of the print head, movement of the print head without movement of the medium, and movement of both the print head and the medium. The detection section encompasses a nozzle ejection state detection section based on a detection voltage of residual vibration of a diaphragm, which constitutes a part of a wall surface of a pressure chamber where pressure is applied to liquid for ejection, and a nozzle ejection state detection section based on captured image taken of a nozzle surface of the print head. Note that the above addendum is also applicable to the following aspects.

Second Aspect

As illustrated in FIGS. 6 and 7, the control section U1 may control to cause the number of the first defective nozzles NZ1*d* that were detected by the detection section U2 to be printed as the information IN0 on the medium ME0 using the second liquid LQ2. In the above case, the user can grasp the number of defective nozzles included in the nozzle group that ejects liquid that is difficult to see in a test pattern and can determine whether or not to have the printing device 1 perform cleaning of the print head 30 based on this number of defective nozzles. Therefore, the above aspect can provide a printing device that enables easily determining whether or not cleaning of the print head should be performed.

Third Aspect

As illustrated in FIGS. 8 to 13, the control section U1 may control to print, on the medium ME0 by using said second liquid LQ2, a first nozzle test pattern TP1 having individual patterns TP1*i* corresponding to the respective positions of first normal nozzles NZ1*n*, excluding the first defective nozzles NZ1*d*, of the plurality of the first nozzles NZ1. In the above case, a simulated test pattern with individual patterns TP1*i* corresponding to the positions of each normal nozzle in the nozzle group, which can eject a hard-to-see liquid, can be printed on medium ME0 using easily visible liquid. Therefore, the above aspect can provide a printing device in which the positions of the defective nozzles included in a nozzle group that ejects a hard-to-see liquid can be grasped by visual inspection of the printed object.

Fourth Aspect

Figure 9:
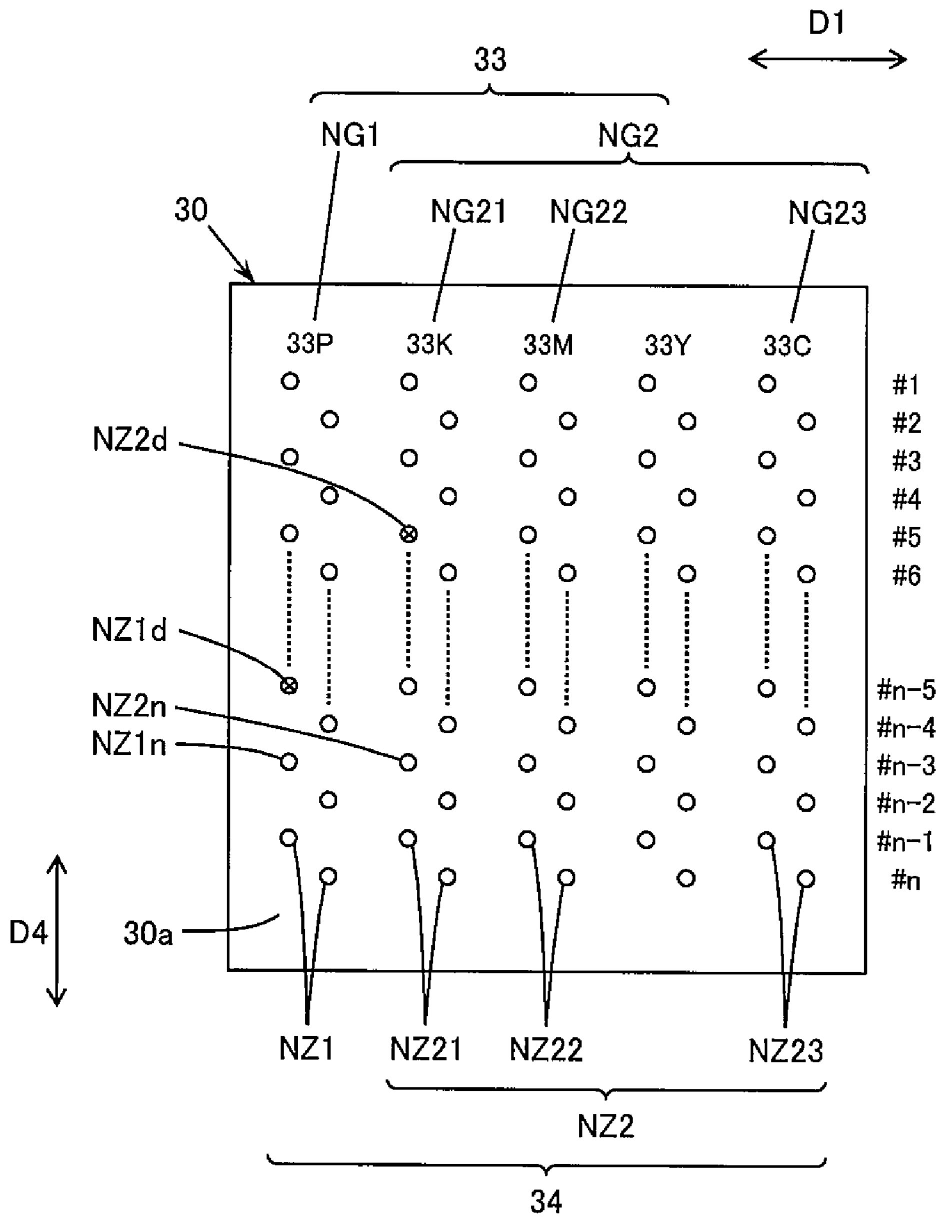
FIG. 9 is a schematic illustration of an example of nozzle groups and nozzle classifications.
Figure 11:
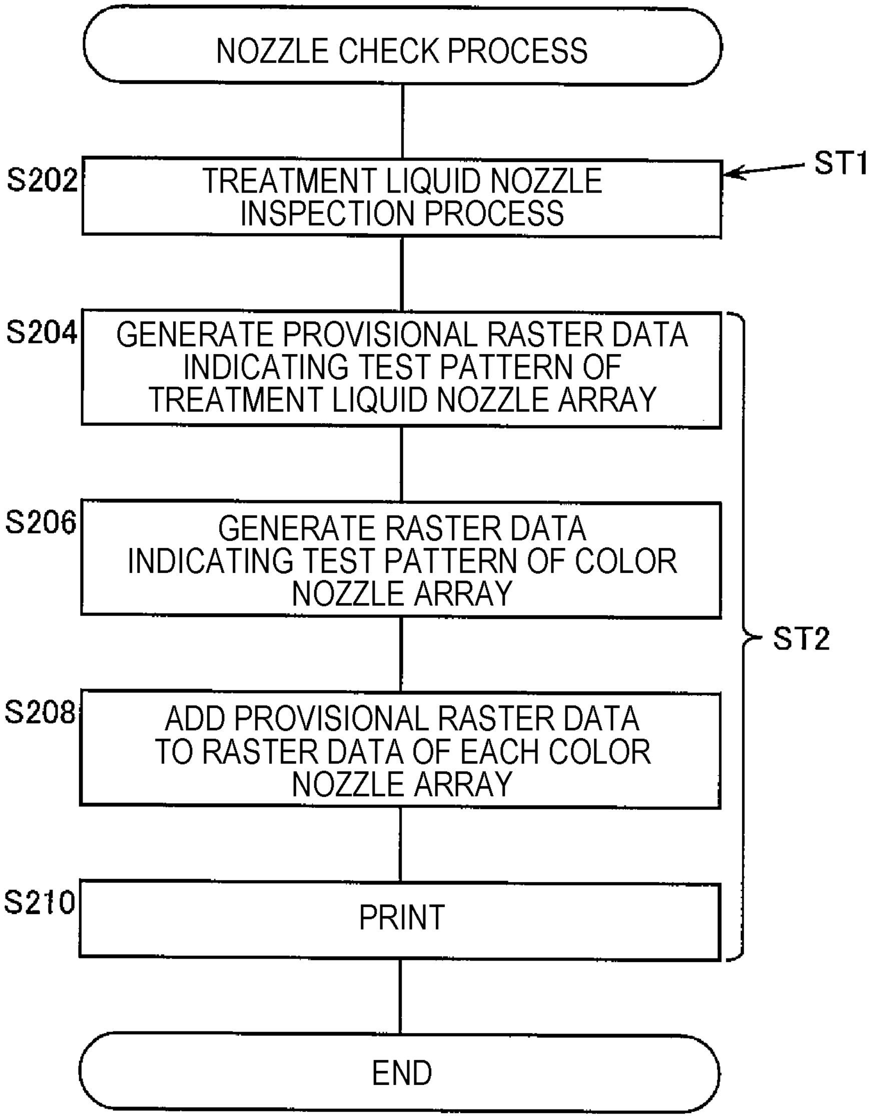
FIG. 11 is a flowchart that schematically illustrates another example of the nozzle check process.

As illustrated in FIG. 9, the print head 30 may have, as the second nozzle group NG2, a first color nozzle group NG21 including a plurality of first color nozzles NZ21 and a second color nozzle group NG22 including a plurality of second color nozzles NZ22. In order to cause the individual patterns TP1*i* corresponding to the positions of each of the first normal nozzles NZ1*n* to be printed on the medium ME0 as illustrated in FIG. 11, the control section U1 may control so that the second liquid LQ2 ejected from the first color nozzle NZ21 and the second liquid LQ2 ejected from the second color nozzle NZ22 overlap on the medium ME0. In the above case, the first nozzle test pattern TP1 including the individual patterns TP1*i*, in which the second liquid LQ2 ejected from the first color nozzles NZ21 and the second color nozzles NZ22 overlap on the medium ME0, is printed on the medium ME0. Therefore, even if one of the first color nozzles NZ21 and the second color nozzles NZ22 is a defective nozzle, the individual patterns TP1*i* can be printed. Therefore, the above aspect can provide a printing device that can print the first nozzle test pattern TP1 on the medium ME0 with less influence of defective nozzles included in the second nozzle group NG2. Furthermore, the print head 30 may have, as the second nozzle group NG2, a third color nozzle group NG23, including a plurality of third color nozzles NZ23. In order to print the individual patterns TP1*i* corresponding to the positions of each of the first normal nozzles NZ1*n* onto the medium ME0, the control section U1 may control to overlap the second liquid LQ2 ejected from the first color nozzles NZ21, the second liquid LQ2 ejected from the second color nozzles NZ22, and the second liquid LQ2 ejected from the third color nozzles NZ23, on the medium ME0.

Fifth Aspect

Figure 12:
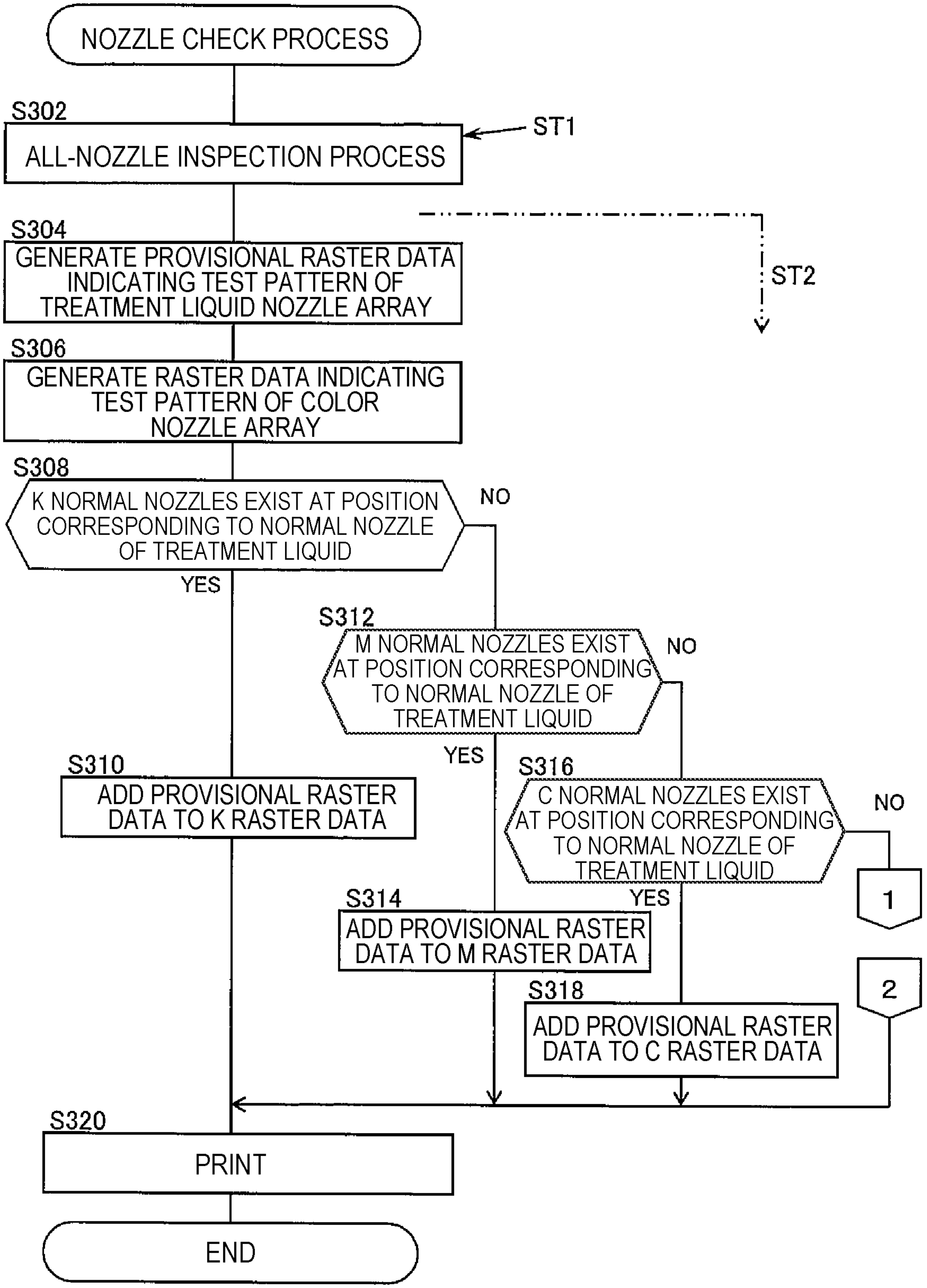
FIG. 12 is a flowchart that schematically illustrates still another example of the nozzle check process.

The detection section U2 may be able to detect the second defective nozzles NZ2*d*, which are ejection failures, in the first color nozzle group NG21 without printing the second nozzle test pattern TP2 on the medium ME0. When, as illustrated in FIG. 12, there are second normal nozzles NZ2*n*, excluding the second defective nozzles NZ2*d* in the plurality of the first color nozzles NZ21, at positions corresponding to the first normal nozzles NZ1*n*, the control section U1 may cause the first nozzle test pattern TP1 to be printed on the medium ME0 by using the second liquid LQ2 ejected from the plurality of the first color nozzles NZ21. If there are second defective nozzles NZ2*d* included in the first color nozzle group NG21 at any of the positions corresponding to the first normal nozzles NZ1*n*, the control section U1 may cause the first nozzle test pattern TP1 to be printed on the medium ME0 by using the second liquid LQ2 ejected from the plurality of second color nozzles NZ22. In the above case, even if the first nozzle test pattern TP1 cannot be printed by using the second liquid LQ2 ejected from the first color nozzle group NG21 due to the second defective nozzles NZ2*d* in the first color nozzles NG21, the second liquid LQ2 ejected from the second color nozzle group NG22 can be used to print the first nozzle test pattern TP1. Since the second liquid LQ2 ejected from the first color nozzles NZ21 and the second color nozzles NZ22 do not overlap on the medium ME0, bleeding of the individual patterns TP1*i* is suppressed. Therefore, the above aspect can provide a printing device that can suppress bleeding of the simulated test pattern with individual patterns corresponding to the positions of each normal nozzles in the nozzle group that ejects hard-to-see liquid. Furthermore, the detection section U2 may be able to detect the second defective nozzles NZ2*d*, which are ejection failures in the second color nozzle group NG22, without printing the second nozzle test pattern TP2 on the medium ME0. If there is a second defective nozzle NZ2*d* in the second color nozzle group NG22 in any of the positions corresponding to the first normal nozzles NZ1*n*, the control section U1 may cause the first nozzle test pattern TP1 to print on the medium ME0 by using the second liquid LQ2 ejected from the plurality of the third color nozzles NZ23.

Sixth Aspect

A printing method according to an aspect of this disclosure is a printing method for printing by changing the relative positional relationship between a medium ME0 and a print head 30 having a first nozzle group NG1 including a plurality of first nozzles NZ1 that can eject a first liquid LQ1 onto the medium ME0, and a second nozzle group NG2 including a plurality of second nozzles NZ2 that can eject a second liquid LQ2, which is more visible than said first liquid LQ1, onto the medium ME0, and includes the following steps.

A1. Detection step ST1 for detecting first defective nozzles NZ1*d*, which are ejection failures, from the first nozzle group NG1 without printing a test pattern indicating ejection state of each of the first nozzles NZ1 on the medium ME0.

A2. Printing step ST2 for printing a second nozzle test pattern TP2 indicating the ejection state of each of the second nozzles NZ2 onto the medium ME0 by using the second liquid LQ2, and for printing information IN0 regarding the first defective nozzles NZ1*d* detected in the detection step ST1 onto the medium ME0 by using the second liquid LQ2.

The above aspect can provide a printing method in which information regarding defective nozzles in a nozzle group that ejects liquid that is difficult to see in a test pattern, can be easily indicated on a printed object together with a test pattern of easily visible liquid.

Furthermore, this technology is applicable to printing systems including the printing devices described above, control methods for the printing devices described above, control methods for the printing systems described above, control programs for the printing devices described above, control programs for the printing systems described above, computer-readable recording media containing any of the control programs described above, and the like. Further, the printing device described above may be constituted by a plurality of distributed parts.

2. SPECIFIC EXAMPLE OF PRINTING DEVICE

Figure 3:
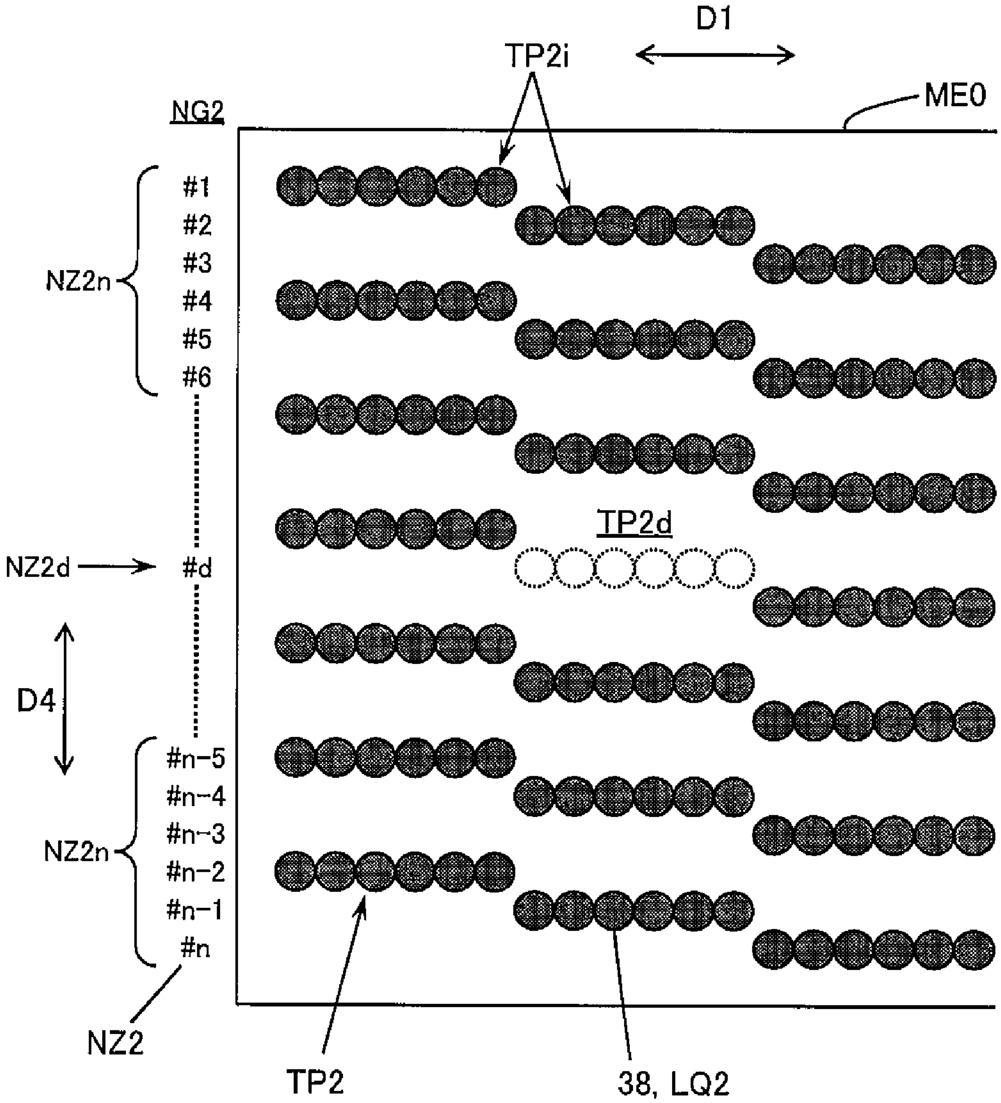
FIG. 3 is a schematic illustration of an example of a second nozzle test pattern by using highly visible second liquid.

FIG. 1 is a schematic example of the printing device 1. The printing device 1 in this specific example shall be a printer 2 itself, but the printing device 1 may be a combination of the printer 2 and a host device HO1. Note that the printer 2 may include additional elements not shown in FIG. 1. FIG. 2 is a schematic example of the nozzle surface 30*a* of the print head 30 and a dot pattern on the medium ME0. FIG. 3 is a schematic example of the second nozzle test pattern TP2 by using highly visible second liquid LQ2.

The printer 2 illustrated in FIG. 1 is a serial printer, a type of inkjet printer, and a textile printing apparatus capable of printing on fabric as print medium ME0. The printer 2 is equipped with a controller 10, a RAM 21 which is semiconductor memory, a communication I/F 22, a storage section 23, an operation panel 24, a print head 30, a drive section 50, a cleaning section 60, a detection section U2 for defective nozzles, and the like. Here, RAM is an abbreviation for random access memory and I/F is an abbreviation for Interface. The controller 10, the RAM 21, the communication I/F 22, the storage section 23, and the operation panel 24 are connected to a bus and can input and output information to and from each other.

The controller 10 has a CPU 11, which is a processor, a color conversion section 12, a halftone processing section 13, a rasterization processing section 14, a drive signal transmission section 15, and the like. Here, CPU is an abbreviation for central processing unit. The controller 10 controls main-scanning and sub-scanning by the drive section 50 and the ejection of droplets 37 from the print head 30, based on original image data DA1 obtained from the host device HO1, a memory card (not shown), or the like. The controller 10 is an example of control section U1 that controls the ejection of first liquid LQ1 and second liquid LQ2 from the print head 30 and the change in relative positional relationship between the print head 30 and the medium ME0 by the drive section 50. For example, RGB data with integer values of $2^8$ gradations or $2^{16}$ gradations of R, G, and B for each pixel can be applied to the original image data DA1. Here, R means red, G means green, and B means blue. The controller 10 can be configured as a SoC or the like. Here, SoC is an abbreviation for system on a chip.

The CPU 11 is the central device for information processing and control in the printer 2. The color conversion section 12, for example, refers to a color conversion LUT that defines a correspondence between R, G, and B gradation values and C, M, Y, and K gradation values, and converts the RGB data into ink amount data DA2 with integer values of $2^8$ or $2^{16}$ gradation levels of C, M, Y, and K for each pixel. Here, C means cyan, M means magenta, Y means yellow, K means black, and LUT is an abbreviation for lookup table. The ink amount data DA2 represents usage amount of the C, M, Y, and K liquid 36 in units of pixels PX0 (see FIG. 2). If the resolution of the RGB data is different from the output resolution, the color conversion section 12 first converts the resolution of the RGB data to the output resolution or converts the resolution of the ink amount data DA2 to the output resolution.

The halftone processing section 13 generates halftone data DA3 by reducing the number of gradations of the gradation values by performing a prescribed halftone processing such as a dither method, error diffusion method, or density pattern method on the gradation values of each pixel PX0 comprising the ink amount data DA2, for example. The halftone data DA3 represents the formation state of the dots 38 in units of pixel PX0. The halftone data DA3 may be binary data indicating whether or not dots are formed, or it may be multi-level data with three or more gradations that can accommodate dots of different sizes, such as small, medium, and large dots. The halftone processing section 13 includes in the halftone data DA3 the binary data or the multi-level data representing the formation state of the dots 38 of the treatment liquid in units of pixel PX0, in accordance with the binary data or the multi-level data of C, M, Y, and K. Details of the treatment liquid will be described later. The rasterization processing section 14 generates raster data RA0 by performing a rasterization process that rearranges the halftone data DA3 in the order in which dots 38 are formed by the drive section 50.

The drive signal transmission section 15 generates a drive signal SG1 corresponding to the voltage signal applying to the drive element 32 of the print head 30 from the raster data RA0 and outputs the drive signal SG1 to the drive circuit 31 of the print head 30. For example, if the raster data RA0 is "dot formation", the drive signal transmission section 15 outputs the drive signal SG1 to eject droplets for dot formation. When the raster data RA0 is four-value data, the drive signal transmission section 15 outputs the drive signal SG1 to eject droplets for large dots if the raster data RA0 is for "large dot formation", the drive signal SG1 to eject droplets for medium dots if the raster data RA0 is for "medium dot formation", and the drive signal SG1 to eject droplets for small dots if the raster data RA0 is for "small dot formation".

Each of the above sections 11 to 15 may be configured by an ASIC, which may directly read the data to be processed from the RAM 21 or directly write the processed data to the RAM 21. Here, ASIC is an abbreviation for application specific integrated circuit.

The drive section 50, controlled by the controller 10, has a carriage drive section 51 and a roller drive section 55. The drive section 50 reciprocates the carriage 52 along the main-scanning direction D1 by driving the carriage drive section 51 and transports the medium ME0 along the transport path 59 in the transport direction D3 by driving the roller drive section 55. As illustrated in FIG. 2, the main-scanning direction D1 is the direction that intersects an alignment direction D4 of the nozzles 34, for example, it is the direction orthogonal to the alignment direction D4. The transport direction D3 is the direction that intersects the main-scanning direction D1, for example, orthogonal to the main-scanning direction D1. In FIG. 1, the transport direction D3 is a rightward direction. The left side of the transport direction D3 is referred to upstream and the right side is referred to downstream. A sub-scanning direction D2 illustrated in FIG. 2 is the opposite direction to the transport direction D3. The carriage drive section 51 reciprocates the carriage 52 along the main-scanning direction D1 under the control of the controller 10. It can be said that the carriage drive section 51 performs main-scanning that changes the relative positional relationship between the print head 30 and the medium ME0 along the main-scanning direction D1. The roller drive section 55 includes a transport roller pair 56 and a discharge roller pair 57. The roller drive section 55 performs a sub-scanning to transport the medium ME0 in the transport direction D3 by rotating the drive transport roller of the transport roller pair 56 and the drive discharge roller of the discharge roller pair 57 according to the control of the controller 10. It can be said that the roller drive section 55 performs sub-scanning that changes the relative positional relationship between the print head 30 and the medium ME0 along the sub-scanning direction D2, which intersects the main-scanning direction D1. The medium ME0 used in the textile printing apparatus is a roll-shaped long fabric.

The print head 30 is mounted on the carriage 52. The carriage 52 may be equipped with a liquid cartridge 35 that holds liquid 36 that is supplied to the print head 30 and ejected as droplets 37. Of course, the liquid 36 may be supplied to the print head 30 via a tube from a liquid cartridge 35 installed outside the carriage 52. The carriage 52 is fixed to an endless belt (not shown) and can move along the guide 53 in the main-scanning direction D1. The guide 53 is an elongated member with its longitudinal direction oriented in the main-scanning direction D1. The carriage drive section 51 has a servo motor, and reciprocates the carriage 52 along the main-scanning direction D1 according to commands from the controller 10. The print head 30 mounted on the carriage 52 can face a cap of the cleaning section 60 to the outside of the print area. The cleaning section 60 can clean the print head 30 facing the cap.

The transport roller pair 56, which is located upstream from the print head 30, transports nipped media ME0 toward the print head 30 during the sub-scanning by the rotation of the drive transport roller. The discharge roller pair 57, which is located downstream from the print head 30, transports the nipped media ME0 toward a medium wind-up section (not shown) by the rotation of the drive discharge roller during sub-scanning. The roller drive section 55 has a servo motor, and drives the transport roller pair 56 and the discharge roller pair 57 according to commands from the controller 10 to transport the medium ME0 in the transport direction D3.

The medium support section 58 is located below the transport path 59 and supports the medium ME0 by contacting the medium ME0 in the transport path 59. The print head 30, which is controlled by the controller 10, deposits liquid 36 on the medium ME0 by ejecting droplets 37 toward the medium ME0 supported by the medium support section 58.

The print head 30, which is equipped with drive circuit 31 and drive elements 32, has nozzles 34 that eject droplets 37 in the nozzle surface 30*a* and prints by ejecting the droplets 37 onto the medium ME0 on the medium support section 58. Here, nozzle means a small hole through which droplets are ejected, and nozzle array means a line of multiple nozzles. The nozzle surface 30*a* is a surface through which the droplets 37 are ejected. The drive circuit 31 applies a voltage signal to the drive element 32 according to the drive signal SG1 input from the drive signal transmission section 15. Liquid 36 is supplied to the pressure chamber of the print head 30 from the liquid cartridge 35. The liquid 36 in the pressure chamber is ejected by the drive elements 32 as droplets 37 from the nozzles 34 toward the medium ME0. This forms dots 38 of droplets 37 on the medium ME0. By repeating the operation of forming the dots 38 based on the raster data RA0 while the print head 30 moves in the main-scanning direction D1, and then transporting the medium ME0 in the transport direction D3 by one sub-scanning transport amount, print image IMO is formed on the medium ME0.

The RAM 21 stores the original image data DA1 and the like received from the host device HO1, a memory (not shown), or the like. The communication I/F 22 is connected by wire or wirelessly to the host device HO1 and inputs and outputs information to and from the host device HO1 The host device HO1 includes computers such as personal computers and tablet terminals, mobile phones such as smartphones, and the like. Nonvolatile semiconductor memories such as flash memories, magnetic storage devices such as hard disks, and the like, can be used for the storage section 23. The operation panel 24 has an output section 25, such as an LCD panel that displays information, and an input section 26, such as a touch panel that accepts operations on the display section.

The print head 30 shown in FIG. 2 has a plurality of nozzle arrays 33 on the nozzle surface 30*a*, including a plurality of nozzles 34 arranged in a staggered pattern, that is, in two rows, at intervals of a predetermined nozzle pitch in the alignment direction D4. The nozzle alignment direction of the plurality of nozzles 34 arranged in the staggered pattern is the direction of the respective nozzle arrays in the two rows. Of course, multiple nozzles 34 in a single nozzle array 33 may be arranged in a single row. Each nozzle array 33 ejects droplets 37 toward the medium ME0. The alignment direction D4 may coincide with the transport direction D3 or may deviate from the transport direction D3 by less than 90°.

In addition to C, M, Y, and K pigment inks, the print head 30 is capable of ejecting a treatment liquid, as droplets 37, that agglomerate components of the pigment inks. When printing on a medium such as fabric by using pigmented ink by an inkjet textile printing apparatus, if no treatment liquid is used, the pigmented ink may penetrate deep into the medium, causing bleeding and degradation of colors. To avoid such problems, a treatment liquid containing a component that agglomerates pigments is used together with pigmented ink. Here, an off-line process is considered in which the treatment liquid is applied to the entire medium in advance before printing with pigmented ink. However, this off-line process applies the treatment liquid outside the textile printing region, so the treatment liquid is used wastefully. If a coating device that applies the treatment liquid to the entire medium in advance is provided in the textile printing apparatus, the apparatus becomes large and complicated. Further, the amount of waste liquid increases, resulting in a high environmental impact. Therefore, in this specific example, the print head 30 ejects the treatment liquid as droplets 37 at the same time as the pigmented ink, so that the treatment liquid adheres to the medium ME0 only in the regions necessary for textile printing. This eliminates the need for a coating device in the textile printing apparatus that applies the treatment liquid to the entire medium in advance and the environmental impact becomes lower.

However, the treatment liquid is commonly clear and colorless. Therefore, it is difficult to visually identify ejection failures of the nozzles for the treatment liquid using the test pattern (TP2) showing the ejection state of each nozzle as illustrated in FIG. 3. It is conceivable to prepare a special paper that reacts with the treatment liquid to produce color. However, it is necessary to develop special paper and the user is at a disadvantage to purchase expensive special paper. Therefore, the printing device 1 in this specific example prints the information regarding defective nozzles in the nozzle array for the treatment liquid on the medium ME0 using an easily visible liquid, together with a test pattern using easily visible liquid.

In the nozzle surface 30*a* of the print head 30 shown in FIG. 2, a treatment liquid nozzle array 33P, a black nozzle array 33K, a magenta nozzle array 33M, a yellow nozzle array 33Y, and a cyan nozzle array 33C are arranged in this order in the main-scanning direction D1. The treatment liquid nozzle array 33P has n nozzles 34 that eject treatment liquid as droplets 37. When these droplets 37 land on the medium ME0, dots 38 of the treatment liquid are formed on the medium ME0. Note that the number of nozzles n is an integer of 2 or more. The black nozzle array 33K has n nozzles 34 that eject K ink as droplets 37. When these droplets 37 land on the medium ME0, dots 38 of the K ink are formed on the medium ME0. The magenta nozzle array 33M has n nozzles 34 that eject M ink as droplets 37. When these droplets 37 land on the medium ME0, dots 38 of the M ink are formed on the medium ME0. The yellow nozzle array 33Y has n nozzles 34 that eject the Y ink as droplets 37. When these droplets 37 land on the medium ME0, dots 38 of the Y ink are formed on the medium ME0. The cyan nozzle array 33C has n nozzles 34 that eject C ink as droplets 37. When these droplets 37 land on the medium ME0, dots 38 of the C ink are formed on the medium ME0.

The treatment liquid is an example of the first liquid LQ1. The C, M, Y, and K inks are examples of the second liquid LQ2, which is more visible than the first liquid LQ1. Note that if the first liquid LQ1 is transparent, the C, M, Y, and K inks are more visible than the first liquid LQ1 because they are opaque. The second liquid LQ2 can be said to be more visible than the first liquid LQ1 when the medium ME0 is a light color including white and an RGB value of the second liquid LQ2 is smaller than an RGB value of the first liquid LQ1, RGB value, wherein RGB values are obtained by calorimetrically measuring the liquids on the medium ME0. For the CMYK values corresponding to the RGB values mentioned above, the second liquid LQ2 is more visible than the first liquid LQ1 if the CMYK values of the second liquid LQ2 are greater than those of the first liquid LQ1.

The nozzles 34 included in the treatment liquid nozzle array 33P are an example of the first nozzles NZ1 that can eject the first liquid LQ1 onto the medium ME0. The treatment liquid nozzle array 33P is an example of the first nozzle group NG1 including the plurality of first nozzles NZ1. Nozzles 34 included in the remaining nozzle arrays 33K, 33M, 33Y, and 33C are examples of second nozzles NZ2 capable of ejecting the second liquid onto the medium ME0. The nozzle arrays 33K, 33M, 33Y, and 33C are examples of the second nozzle group NG2, which includes a plurality of second nozzles NZ2. FIG. 2 shows schematically the first normal nozzles NZ1*n*, which are the normal nozzles of the first nozzle group NG1, the first defective nozzles NZ1*d*, which is the defective nozzle of the first nozzle group NG1, the second normal nozzles NZ2*n*, which are the normal nozzle of the second nozzle group NG2, and the second defective nozzle NZ2*d*, which are the defective nozzles of the second nozzle group NG2. For convenience, the n nozzles 34 in each nozzle array 33 are identified as #1, #2, . . . , #n−1, and #n in this order along the alignment direction D4.

Note that the second liquid LQ2 with high visibility can be, for example, pigmented ink containing dispersion medium such as water, pigment, surfactant, and the like. The pigment may be inorganic pigment or organic pigment. The surfactant can be an acetylene glycol-based surfactant, fluorinated surfactant, silicone surfactant, and others. The treatment liquid as the first liquid LQ1 can be, for example, a liquid containing a solvent such as water, a cationic compound, a surfactant as described above, and others. The cationic compounds agglomerates pigments and suppress bleeding and degradation of colors. The cationic compounds can be multivalent metal salt, organic acid, cationic resin, cationic surfactant, and others. The printing device 1 may be further equipped with a coater that coats resin to fix pigments on the surface of the medium ME0.

FIG. 3 illustrates an example of the second nozzle test pattern TP2, which shows ejection state of each of the second nozzles NZ2 included in the second nozzle group NG2. The second nozzle test pattern TP2 is printed when the print job is changed or the lot of the medium ME0 is changed. The second nozzle test pattern TP2 is formed on the medium ME0 by dots 38 of the highly visible second liquid LQ2. The second nozzle test pattern TP2 has second individual patterns TP2*i* corresponding to the positions of each of the second nozzles NZ2 in the alignment direction D4. Each second individual pattern TP2*i* is a linear pattern with a series of dots 38 in the main-scanning direction D1. To show the correspondence relationship between the second individual patterns TP2*i*, which are along the main-scanning direction D1, and the second nozzles NZ2 in a manner easy to understand, the second individual patterns TP2*i* corresponding to each of the adjacent second nozzles NZ2 in the alignment direction D4 are positioned shifted in the main-scanning direction D1. In the second nozzle test pattern TP2 illustrated in FIG. 3, the second nozzles NZ2 are equally divided into three groups, and the second individual patterns TP2*i* are located so that positions in the main-scanning direction D1 of each group do not overlap between groups. Assuming that the nozzle number is i, then in the second nozzle test pattern TP2, the leftmost group corresponds to the second nozzle NZ2 whose reminder is 1 when the nozzle number i is divided by 3, the middle group corresponds to the second nozzle NZ2 whose reminder is 2 when the nozzle number i is divided by 3, and the rightmost group corresponds to the second nozzle NZ2 whose nozzle number i is divisible by 3. Of course, the arrangement of the plurality of second individual patterns TP2*i* may be divided into four or more groups.

Now, assume that among the nozzles #1 to #n in the second nozzle group NG2, the nozzle #d is the second defective nozzle NZ2*d*, which is an ejection failure, and the remaining nozzles are the second normal nozzles NZ2*n*, which can eject normally. From each second normal nozzle NZ2*n*, droplets 37 are ejected normally, and the second individual patterns TP2*i* corresponding to each of the second normal nozzles NZ2*n* are formed on the medium ME0. On the other hand, the droplets 37 are not ejected normally from the second defective nozzle NZ2*d*. Therefore, the second individual pattern TP2*i* corresponding to the second defective nozzle NZ2*d* is not formed normally. FIG. 3 illustrates a location corresponding to the second defective nozzle NZ2*d* in the medium ME0 as a second missing pattern TP2*d*. By viewing the second missing pattern TP2*d* of the second test pattern TP2, the user can know positions and number of the second defective nozzles NZ2*d* included in the second nozzle group NG2. Note that if the print head 30 ejects the second liquid LQ2 without ejecting the reaction liquid onto the fabric, the second individual patterns TP2*i* can be still visible, but bleeding and degradation of color may occur. Of course, the second nozzle test pattern TP2 may be printed on the fabric by ejecting droplets from the print head 30 so that the reaction liquid and the second liquid LQ2 overlap on the fabric.

Even if a nozzle pattern is formed on the medium ME0 using the low visible treatment liquid, it is difficult to grasp information regarding the defective nozzles of the treatment liquid nozzle array 33P, which includes a plurality of the first nozzles NZ1 that eject the treatment liquid. Therefore, the print head 30 is provided with a detection section U2 that can detect the first defective nozzles NZ1*d*, which are ejection failures, in the treatment liquid nozzle array 33P without printing on the medium ME0 a test pattern indicating the ejection state of each of the first nozzles NZ1 included in the treatment liquid nozzle array 33P. The detection section U2 detects ejection state of the nozzles 34 based on the detection voltage of the residual vibration of a diaphragm 39, which constitutes a part of wall surfaces of the pressure chamber that applies pressure for the liquid 36 ejected from the nozzle 34. If the viscosity of the liquid 36 in the nozzle 34 increases, if air bubbles enter the nozzle 34, if dust or paper particles adhere to the nozzles 34, and the like, the residual vibration will change from its normal state. The detection section U2 can determine that the nozzle 34 is normal when the residual vibration is within the normal range, and can determine that the nozzle 34 is defective when the residual vibration is out of the normal range. The term "can detect the first defective nozzles NZ1*d*, which are ejection failures, in the treatment liquid nozzle array 33P without printing" means that the detection section U2 can detect the first defective nozzles NZ1*d* without requiring the ejection result of the liquid ejected from the treatment liquid nozzle array 33P in order to detect the first defective nozzle NZ1*d*, which is an ejection failure. The term "detection section capable of detecting a first defective nozzles, which are ejection failures, in the first nozzle group without printing a test pattern showing the ejection state of each of the first nozzles on the medium" is synonymous with "a detection section capable of detecting the first defective nozzles, which are ejection failures, in the first nozzle group without using a test pattern indicating the ejection state of each of the first nozzles".

Figure 4:
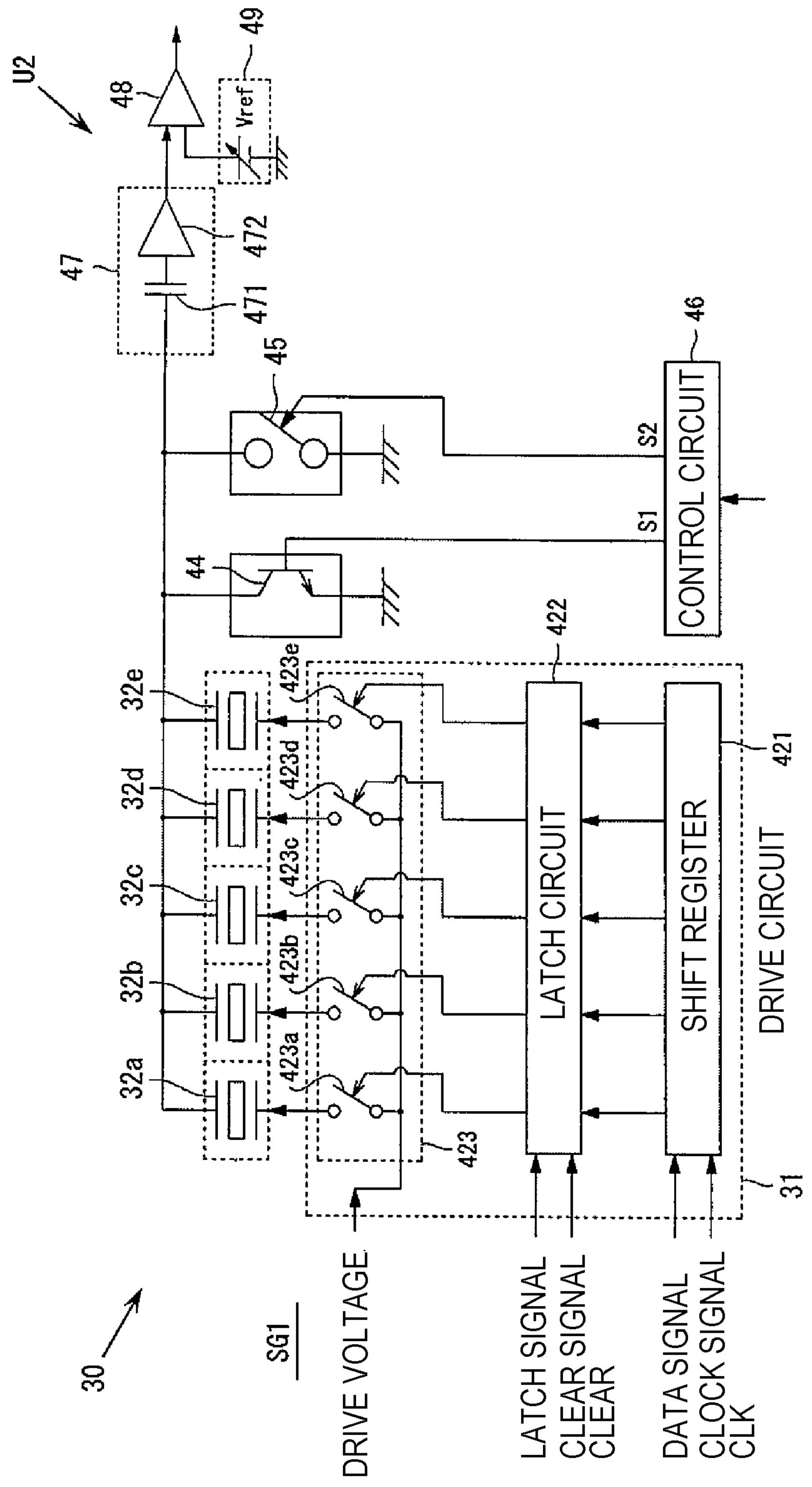
FIG. 4 is a schematic block diagram of an example configuration of the print head and a detection section for defective nozzles.
Figure 5:
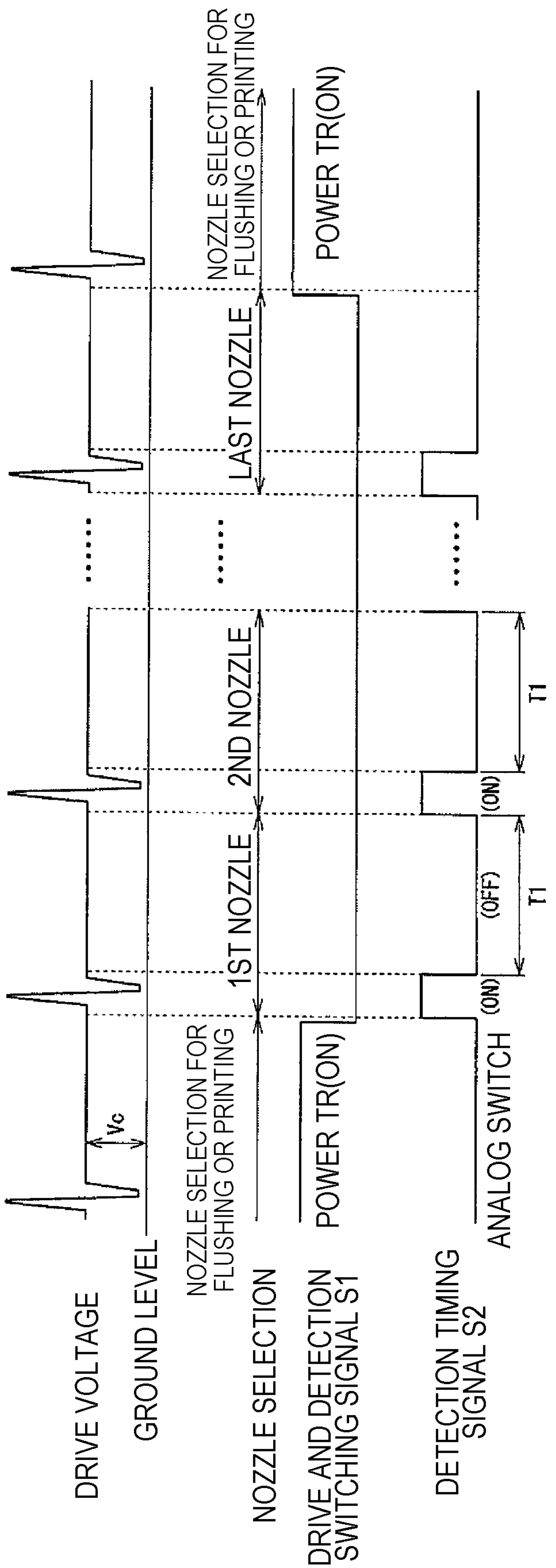
FIG. 5 is a schematic waveform illustrating an example of a waveform of each time period.

FIG. 4 schematically illustrates an example of the configuration of the print head 30 and the defective nozzle detection section U2. FIG. 5 schematically illustrates examples of waveforms of each time period. The print head 30 is equipped with a drive circuit 31, piezoelectric actuators 32*a* to 32*e*, which constitute the drive element 32, and the like. The detection section U2 for defective nozzles is equipped with a power transistor 44, an analog switch 45, a control circuit 46, an AC amplifier 47, a comparator 48, a reference voltage generation circuit 49, and others. Note that each piezoelectric actuator is provided corresponding to pressure chamber connected to the nozzles 34. The number of piezoelectric actuators is not limited to the five illustrated in FIG. 4, and the print head 30 is equipped with many piezoelectric actuators.

A drive voltage, a latch signal, a clear signal CLEAR, a data signal, a clock signal CLK, and the like, are input to the drive circuit 31 as the drive signal SG1 shown in FIG. 1. The piezoelectric actuators 32*a* to 32*e* include, for example, piezoelectric elements, which are displaced when drive voltage shown in FIG. 5 is applied between the electrodes of the piezoelectric elements. Each piezoelectric actuator 32*a* to 32*e* is normally applied with around intermediate potential Vc. In accordance with change in the drive voltage, pressure is applied to the liquid 36 in the pressure chamber through the diaphragm 39, and droplets 37 are ejected from the nozzles 34.

The drive circuit 31 has a shift register 421, a latch circuit 422, and a driver 423. The drive circuit 31 selects the nozzles 34 from which the droplets 37 are ejected, and supplies drive voltage to the piezoelectric actuators corresponding to the selected nozzles 34 among the piezoelectric actuators 32*a* to 32*e*. Data signals corresponding to raster data RA0 are sequentially input to the shift register 421 from the drive signal transmission section 15.

The latch circuit 422 temporarily latches data signals output from the shift register 421 for the number of the nozzles 34 in synchronization with periodic latch signals. When the clear signal CLEAR is input to the latch circuit 422, the latch state is released, the output of the latch circuit 422 becomes "0", and the printing operation stops. If the clear signal CLEAR is not input to the latch circuit 422, the latch circuit 422 outputs the latched data signal to the driver 423. The latch circuit 422 repeatedly latches the data signal output from the shift register 421 in synchronization with the print timing and outputs the data signal to the driver 423. The driver 423 supplies drive voltage to the piezoelectric actuators 32*a* to 32*e* selected by the data signal from the latch circuit 422. The driver 423 has switches 423*a* to 423*e*, which are switching elements connected to piezoelectric actuators 32*a* to 32*e*. Each of the switches 423*a* to 423*e* is turned on and off by the corresponding data signal from the latch circuit 422.

The detection section U2 for the defective nozzles detects an electromotive voltage of each of the piezoelectric actuators 32*a* to 32*e* that is generated in response to the residual vibration of the diaphragm 39 when the nozzle 34 is inspected. An input section of the detection section U2 is connected to a common connection portion of each piezoelectric actuators 32*a* to 32*e*.

A collector terminal of the power transistor 44 is connected to the common connection portion of the piezoelectric actuators 32*a* to 32*e*. An emitter terminal of the power transistor 44 is connected to ground. A base terminal of the power transistor 44 is supplied with a drive and detection switching signal S1, which is output from the control circuit 46. The power transistor 44 is a high current capacity switching device controlled on and off by the drive and detection switching signal S1, and makes the common connection portion of the piezoelectric actuators 32*a* to 32*e* connect or not connect the ground voltage. One terminal of the analog switch 45 is connected to the common connection portion of the piezoelectric actuators 32*a* to 32*e*. The other terminal of the analog switch 45 is connected to ground voltage. The analog switch 45 is controlled on and off by detection timing signal S2 output from control circuit 46, and is a switching element with small current capacity that allows sufficient current to flow when driving one of the piezoelectric actuators 32*a* to 32*e*.

Based on instructions from the controller 10, the control circuit 46 generates the drive and detection switching signal S1 and the detection timing signal S2, depending on whether it is during time of printing or flushing or time of nozzle 34 inspection, and outputs these signals S1 and S2. The AC amplifier 47 amplifies the electromotive voltage of the piezoelectric actuators 32*a* to 32*e*, that is, the AC components of the residual vibration waveform generated by the mechanical changes of the diaphragm 39. The AC amplifier 47 includes a capacitor 471 that cuts the DC component contained in the voltage generated by the piezoelectric actuators 32*a* to 32*e*, and an amplifier 472 that amplifies the AC component whose DC component has been cut by the capacitor 471.

The comparator 48 compares the output voltage from the AC amplifier 47 with a reference voltage Vref of the reference voltage generation circuit 49, and outputs a pulse waveform voltage, as a residual vibration waveform, according to the result of the comparison. The reference voltage generation circuit 49 generates a reference voltage Vref to be supplied to the comparator 48.

During printing or flushing, the control circuit 46 sets the drive and detection switching signal S1 high and the detection timing signal S2 low, as illustrated in FIG. 5. This turns on the power transistor 44 and turns off the analog switch 45 and the drive voltage is supplied to the piezoelectric actuators 32*a* to 32*e* corresponding to the nozzles 34 that are selected based on the data signal. During the inspection of the nozzles 34, the control circuit 46 sets the drive and detection switching signal S1 low and the detection timing signal S2 high. This turns off the power transistor 44 and turns on the analog switch 45 and drive voltage is supplied to the piezoelectric actuator 32*a* corresponding to a first nozzle of the nozzles 34. Then, after a pause period Tl, the driving voltage is repeatedly supplied to the piezoelectric actuator corresponding to next nozzle, that is a second nozzle of the nozzles 34. During each pause period Tl, the detection section U2 detects the electromotive voltage of the piezoelectric actuator due to the residual vibration of the diaphragm 39, and the comparator 48 outputs the residual vibration waveform. The comparator 48 is connected to a waveform determination section (not shown) and the waveform determination section determines whether the nozzle 34 is a normal nozzle or a defective nozzle based on the residual vibration waveform. The waveform determination section may be provided in the controller 10.

The control section U1 of this specific example controls to cause the second nozzle test pattern TP2 to be printed on the medium ME0 by using the highly visible second liquid LQ2, and to cause the information regarding the first defective nozzle NZ1*d*, which should eject the less visible first liquid LQ1, to be printed on the medium ME0 by using the highly visible second liquid LQ2. Referring to FIGS. 6 to 13 below, the information IN0 of the first defective nozzles NZ1*d* and various specific examples of this information IN0 and printing control will be described.

3. FIRST SPECIFIC EXAMPLE

FIG. 6 schematically illustrates the medium ME0 on which the information IN0 of the first defective nozzles NZ1*d* included in the treatment liquid nozzle array 33P is printed together with the second nozzle test pattern TP2. During the inspection of the nozzles 34, the controller 10 causes the second nozzle test pattern TP2 of each nozzle array (33K, 33M, 33Y, and 33C) that can eject the highly visible second liquid LQ2 to be printed onto the medium ME0 by using the ink corresponding to each nozzle array. The second nozzle test pattern TP2 has a plurality of ruled second individual patterns TP2*i* along the main-scanning direction D1. The controller 10 also causes the number of first defective nozzles NZ1*d* detected by the detection section U2 to be printed onto the medium ME0 by using the highly visible second liquid LQ2, for example, K ink, as the information IN0. For example, if the detection section U2 detects eight first defective nozzles NZ1*d*, then as illustrated in FIG. 6, "8" indicating the number of first defective nozzles NZ1*d* is printed on the media ME0 as the information IN0. Note that even if some of the multiple second nozzles NZ2 for printing the information IN0 have defective nozzles, the information IN0 to be printed can still be read.

FIG. 7 schematically illustrates a nozzle check process performed by the controller 10 to form the printed object illustrated in FIG. 6. The controller 10 initiates the nozzle check process when the lot of the medium ME0 is changed or when a print job is changed. Step S102 corresponds to the detection step ST1, and steps S104 to S112 correspond to the printing step ST2. Hereinafter, the word "step" may be omitted and the symbol for the step shown in parentheses. Explanation will be made also referring to FIGS. 1 to 6.

When the nozzle check process starts, the controller 10 causes the detection section U2 to perform a treatment liquid nozzle inspection process to detect the first defective nozzles NZ1*d* (see FIG. 2) in the treatment liquid nozzle array 33P (S102). As explained with reference to FIGS. 4 and 5, the detection section U2 detects whether each of the first nozzles NZ1 included in the treatment liquid nozzle array 33P is as first normal nozzle NZ1*n* or a first defective nozzle NZ1*d*, based on the detected voltage of the residual vibration of the diaphragm 39. After the treatment liquid nozzle inspection process, the controller 10 counts the number of the first defective nozzles NZ1*d* detected by the detection section U2 (S104).

Next, the controller 10 generates provisional raster data indicating the number of the first defective nozzles NZ1*d* (S106). The provisional raster data is data formed and represented by single color dots indicating on the medium ME0 the number of defective nozzles. Thus, if the provisional raster data is assigned to K ink, the number of defective nozzles will be printed on medium ME0 with black ink, and if the provisional raster data is assigned to M ink, the number of defective nozzles will be printed on medium ME0 with magenta ink.

Next, the controller 10 generates raster data for the second nozzle test pattern TP2, which shows ejection state of each second nozzle NZ2 of the color nozzle arrays (33K, 33M, 33Y, and 33C) (S108). The raster data of the second nozzle test pattern TP2 is data that, as illustrated in FIG. 6, represents the second nozzle test pattern TP2 formed by dots.

The second nozzle group NG2 can be said to include the first color nozzle group NG21 and the second color nozzle group NG22, which is different from the first color nozzle group NG21. Note that the provisional raster data may be added to the M raster data, the C raster data, or the like. Finally, the controller 10 executes printing by generating the drive signal SG1 based on the K, M, Y, and C raster data in the drive signal transmission section 15 and by transmitting the drive signal SG1 to the print head 30 while controlling the drive section 50 (S112). At that time, the controller 10 causes the second nozzle test pattern TP2 to be printed on the medium ME0 using the K, M, Y, and C colored inks, and causes the number of first defective nozzles NZ1*d* to be printed on the medium ME0 using the K ink. As illustrated in FIG. 6, this produces a printed object having the second nozzle test pattern TP2 on the media ME0 and the number of first defective nozzles NZ1*d* on the medium ME0 as the information IN0.

As described above, for each of the second nozzles NZ2 that can eject the highly visible second liquid LQ2, the second nozzle test pattern TP2 indicating the ejection state of each of the second nozzles NZ2 is printed on the medium ME0. On the other hand, for each of the first nozzles NZ1 that can eject the low visible first liquid LQ1, the detection section U2 detects whether each of the first nozzles is a first normal nozzle NZ1*n* or a first defective nozzle NZ1*d*. The information IN0 regarding the detected first defective nozzle NZ1*d* is printed on the media ME0 with the highly visible second liquid LQ2. As described above, the information IN0 to be printed can be read even if there are defective nozzles in some of the multiple second nozzles NZ2 for printing the information IN0. By viewing the printed object as illustrated in FIG. 6, the user can also know the information IN0 of the first defective nozzles NZ1*d* included in the first nozzle group NG1 that can eject the first liquid LQ1, which is difficult to see in the test pattern, in addition to the second nozzle test pattern TP2 using the second liquid LQ2, which is highly visible. The user can decide whether or not to have the printing device 1 perform the cleaning of the print head 30 based on the number of the first defective nozzles NZ1*d* as the information IN0. Thus, the first specific example can make it easier to determine whether or not to perform cleaning of the print head.

Note that after cleaning by the cleaning section 60 is performed as necessary, normal printing is performed. In normal printing, the treatment liquid ejected from the treatment liquid nozzle array 33P, and the colored inks ejected from the color nozzle arrays (33K, 33M, 33Y, and 33C) overlap on the medium ME0. This allows the pigments in the colored inks to be agglomerated by the treatment liquid, thereby preventing bleeding and color degradation.

4. SECOND SPECIFIC EXAMPLE

Figure 8:
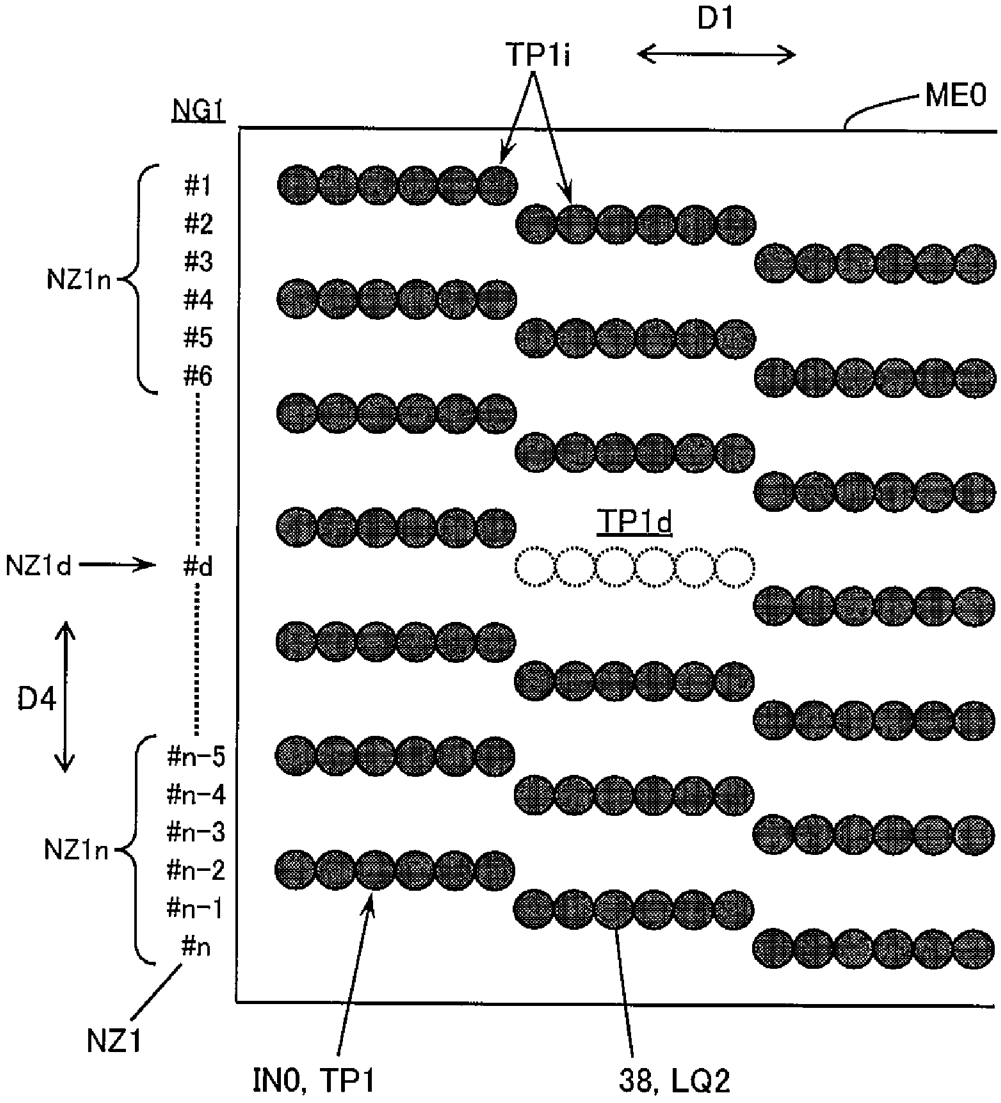
FIG. 8 is a schematic illustration of an example of a simulated first nozzle test pattern with individual patterns corresponding to the positions of each of first normal nozzles in the first nozzle group that can eject the first liquid with low visibility.

FIG. 8 illustrates, for example, a simulated first nozzle test pattern TP1 consisting of individual patterns TP1*i* corresponding to the positions of each of the first normal nozzles NZ1*n* in the first nozzle group NG1 that can eject the low visible first liquid LQ1. As described above, for the treatment liquid nozzle array 33P of the first nozzle group NG1, if a nozzle pattern was formed on the medium ME0 using the treatment liquid, which is the first liquid LQ1 with low visibility, it is difficult to determine the information IN0 of the first defective nozzles NZ1*d* from the nozzle pattern. Therefore, as illustrated in FIG. 8, it is conceivable to print the simulated first nozzle test pattern TP1 by using the second liquid LQ2 that is more visible than the first liquid LQ1.

The first nozzle test pattern TP1 illustrated in FIG. 8 is the individual patterns TP1*i* corresponding to positions of each of the first normal nozzles NZ1*n*, excluding the first defective nozzle NZ1*d*, among the plurality of first nozzles NZ1 included in the first nozzle group NG1. The first nozzle test pattern TP1 is printed on the medium ME0 with the highly visible second liquid LQ2. Each individual pattern TP1*i* is a linear pattern with a series of dots 38 of the second liquid LQ2 in the main-scanning direction D1. Similarly to the second nozzle test pattern TP2, to easily show the correspondence relationship between the individual patterns TP1*i*, which are along the main-scanning direction D1, and the first nozzles NZ1, the individual pattern TP1*i* corresponding to each of the adjacent first nozzles NZ1 in the alignment direction D4 is at a shifted position in the main-scanning direction D1. Also in the first nozzle test pattern TP1 illustrated in FIG. 8, a plurality of first nozzles NZ1 are equally divided into three groups, and a plurality of individual patterns TP1*i* are located so that the position of each group in the main-scanning direction D1 does not overlap between groups. Assuming that the nozzle number is i, in the first nozzle test pattern TP1, the leftmost group corresponds to the first nozzle NZ1 whose reminder is 1 when the nozzle number i is divided by 3, the middle group corresponds to the first nozzle NZ1 whose reminder is 2 when the nozzle number i is divided by 3, and the rightmost group corresponds to the first nozzle NZ1 whose nozzle number i is divisible by 3. Of course, the arrangement of the plurality of individual patterns TP1*i* may be divided into four or more groups.

Now, assume that among the nozzles #1 to #n in the first nozzle group NG1, the nozzle #d is the first defective nozzle NZ1*d* with ejection failure, and the remaining nozzles are the first normal nozzles NZ1*n* with normal ejection. The individual pattern TP1*i* corresponding to each first normal nozzle NZ1*n* is formed on the medium ME0, and no individual pattern TP1*i* is formed at the position corresponding to the first defective nozzle NZ1*d*. In FIG. 8, a location corresponding to the first defective nozzle NZ1*d* in the medium ME0 is shown as a first missing pattern TP1*d*. By viewing the first missing pattern TP1*d* in the first test pattern TP1, the user can know positions and number of the first defective nozzles NZ1*d* included in the first nozzle group NG1. Note that the first nozzle test pattern TP1 shall be formed by the second liquid LQ2 without overlapping the first liquid LQ1 on the medium ME0. However, the first nozzle test pattern TP1 may be formed by overlapping the first liquid LQ1 and the second liquid LQ2 on the medium ME0.

FIG. 9 shows a schematic example of a nozzle group and classification of nozzles to illustrate the second specific example. The print head 30 has, as the second nozzle group NG2, a first color nozzle group NG21 including a plurality of first color nozzles NZ21 and a second color nozzle group NG22 including a plurality of second color nozzles NZ22. The second nozzle group NG2 can be said to include the first color nozzle group NG21 and the second color nozzle group NG22, which is different from the first color nozzle group NG21. In the example shown in FIG. 9, the black nozzle array 33K corresponds to the first color nozzle group NG21, and the magenta nozzle array 33M corresponds to the second color nozzle group NG22. The second nozzles NZ2 can be said to include a plurality of first color nozzles NZ21 and a plurality of second color nozzles NZ22 that are different from the plurality of first color nozzles NZ21. In the example shown in FIG. 9, the second nozzles NZ2 of K correspond to the first color nozzles NZ21, and the second nozzles NZ2 of M correspond to the second color nozzles NZ22.

Of course, there are various possible combinations of what corresponds to the first color nozzle group NG21 and the second color nozzle group NG22 in the second nozzle group NG2. For example, the magenta nozzle array 33M may correspond to the first color nozzle group NG21, the cyan nozzle array 33C to the second color nozzle group NG22, the first nozzles NZ1 of M to the first color nozzles NZ21, and the first nozzles NZ1 of C to the second color nozzles NZ22. Furthermore, the print head 30 may have, as the second nozzle group NG2, a third color nozzle group NG23, including a plurality of third color nozzles NZ23. In this case, the second nozzle group NG2 can be said to further include the third color nozzle group NG23. Therefore, the second nozzles NZ2 may include a plurality of third color nozzles NZ23 different from the plurality of first color nozzles NZ21 and the plurality of second color nozzles NZ22. In the example shown in FIG. 9, the cyan nozzle array 33C corresponds to the third color nozzle group NG23, and the second nozzle NZ2 of C corresponds to the third color nozzles NZ23.

Figure 10:
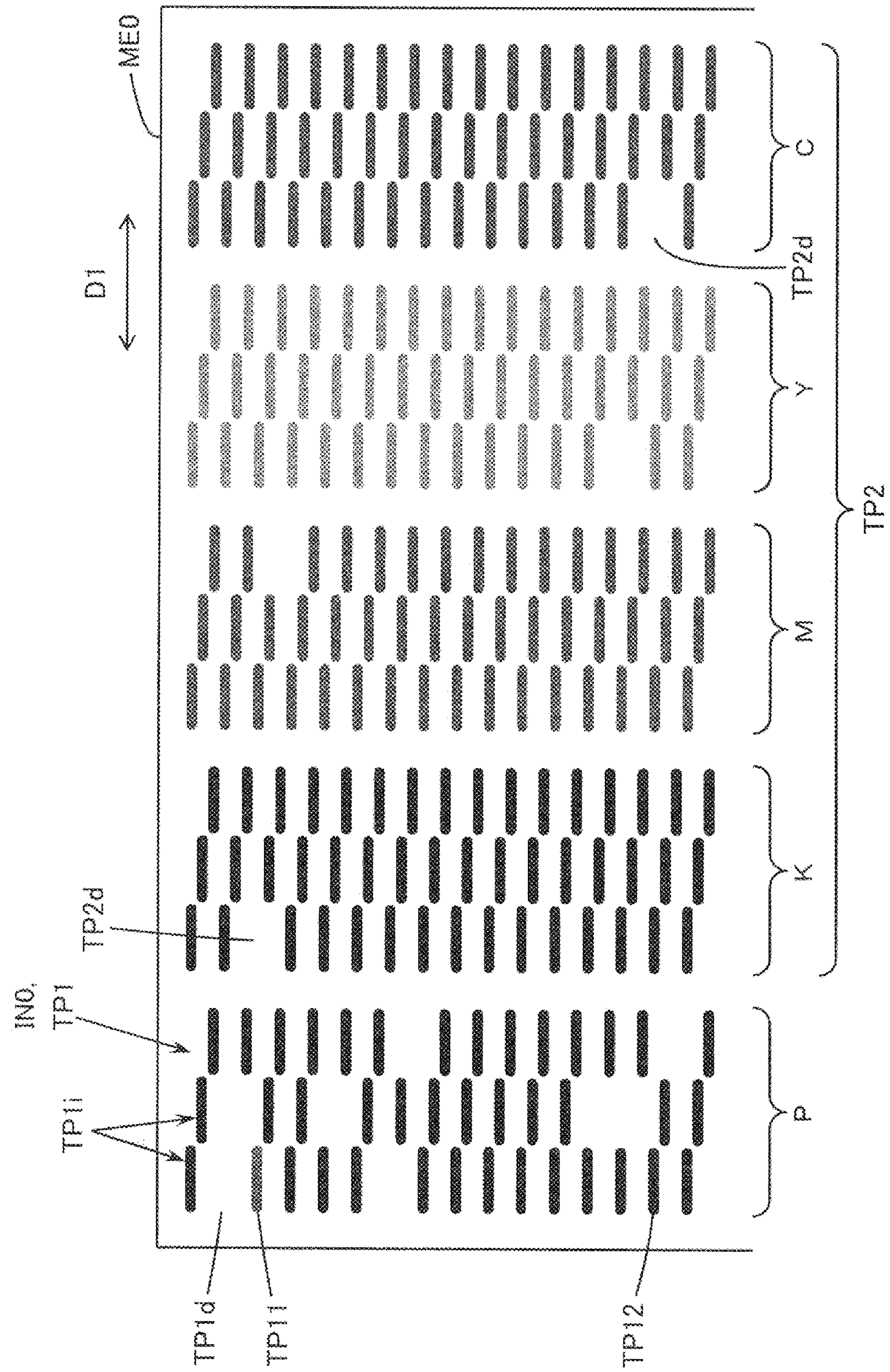
FIG. 10 is a schematic illustration of an example of the printed object with the simulated first nozzle test pattern and the second nozzle test pattern.

FIG. 10 schematically illustrates the simulated first nozzle test pattern TP1 and the second nozzle test pattern TP2 printed on the medium ME0. During the inspection of the nozzles 34, the controller 10 causes the second nozzle test pattern TP2 of each nozzle array (33K, 33M, 33Y, and 33C) that can eject the highly visible second liquid LQ2 to be printed onto the medium ME0 by using the ink corresponding to each nozzle array. In order to cause the individual patterns TP1*i*, which correspond to the positions of each of the first normal nozzles NZ1*n* in the treatment liquid nozzle array 33P of the first nozzle group NG1, to be printed on the medium ME0, the controller 10 controls to cause the second liquid LQ2 ejected from at least the first color nozzles NZ21 and the second color nozzles NZ22 to overlap on the medium ME0. In the combination example illustrated in FIG. 9, at least the K ink ejected from the black nozzle array 33K and the M ink ejected from the magenta nozzle array 33M are superimposed on the medium ME0, and a simulated first nozzle test pattern TP1 is printed on the medium ME0. The first nozzle test pattern TP1 has a plurality of ruled individual patterns TP1*i* along the main-scanning direction D1. By printing the first nozzle test pattern TP1 with multiple colored inks overlaid on the medium ME0, each individual pattern TP1*i* can be formed even if there are defective nozzles in the color nozzle arrays (33K, 33M, 33Y, and 33C).

The first nozzle test pattern TP1 illustrated in FIG. 10 is formed by overlapping K, M, Y, and C colored inks on the medium ME0. For example, the individual pattern TP11 in the first nozzle test pattern TP1 corresponds to the missing pattern TP2*d* in the second nozzle test pattern TP2 of K in FIG. 10, that is, the second defective nozzle NZ2*d* in the black nozzle array 33K. Therefore, the individual pattern TP11 is formed with M, Y, and C colored inks except K ink. The individual pattern TP12 included in the first nozzle test pattern TP1 corresponds to the second missing pattern TP2*d* in the cyan nozzle array 33C as indicated in FIG. 10 by the missing pattern TP2*d* in the second nozzle test pattern TP2 of C. Therefore, the individual pattern TP12 is formed with K, M, and Y colored inks except C ink. In this way, each of the individual patterns TP1*i* can be printed even if some of the multiple color nozzles corresponding to the first normal nozzle NZ1*n* of the treatment liquid nozzle array 33P are the second defective nozzles NZ2*d*. In other words, the first nozzle test pattern TP1, which is less affected by the second defective nozzles NZ2*d* in the color nozzle arrays (33K, 33M, 33Y, and 33C), can be printed on the medium ME0.

FIG. 11 is a flowchart that schematically illustrates a nozzle check process performed by the controller 10 to form the printed object illustrated in FIG. 10. Here again, the controller 10 initiates the nozzle check process when the lot of medium ME0 is changed or when the print job is changed.

S202 corresponds to the detection step ST1, and S204 to S210 correspond to the printing step ST2. When the nozzle check process starts, the controller 10 causes the detection section U2 to perform a treatment liquid nozzle inspection process similar to S102 illustrated in FIG. 7 (S202). As explained with reference to FIGS. 4 and 5, the detection section U2 detects whether each of the first nozzles NZ1 included in the treatment liquid nozzle array 33P is as first normal nozzle NZ1*n* or a first defective nozzle NZ1*d*, based on the detected voltage of the residual vibration of the diaphragm 39.

After the treatment liquid nozzle inspection process, the controller 10 generates the provisional raster data showing the first nozzle test pattern TP1 with individual patterns TP1*i* corresponding to the positions of each of the first normal nozzles NZ1*n* detected by the detection section U2 (S204). The provisional raster data is data formed and represented by single color dots indicating the simulated first test pattern TP1. For example, if the provisional raster data is assigned to K and M, the first nozzle test pattern TP1 will be printed on the medium ME0 by overlapping K ink and M ink on the medium ME0. Next, the controller 10 generates the raster data for the second nozzle test pattern TP2, which shows the ejection state of each of the second nozzles NZ2 of the color nozzle arrays (33K, 33M, 33Y, and 33C) (S206), as in S108 illustrated in FIG. 7. The raster data of the second nozzle test pattern TP2 is data that, as illustrated in FIG. 10, represents the second nozzle test pattern TP2 formed by dots.

Next, the controller 10 adds the provisional raster data formed in a single color to the raster data of all color nozzle arrays, that is, K, M, Y, and C (S208). Finally, the controller 10 executes printing by generating the drive signal SG1 in the drive signal transmission section 15 based on the K, M, Y, and C raster data and transmitting the drive signal SG1 to the print head 30 while controlling the drive section 50 (S210). At that time, the controller 10 causes the second nozzle test pattern TP2 to be printed on the media ME0 with the colored inks for each of colors K, M, Y, and C. The controller 10 also causes a simulated first nozzle test pattern TP1 to be printed on the medium ME0 by overlapping the K, M, Y, and C colored inks on the medium ME0. As shown in FIG. 10, this produces a printed object with the second nozzle test pattern TP2 and, as the information IN0, the simulated first nozzle test pattern TP1 with K, M, Y, and C colored inks overlaid on the medium ME0.

As described above, the simulated first nozzle test pattern TP1 printed on medium ME0 with the highly visible second liquid LQ2 has individual patterns TP1*i* corresponding to the positions of each of the first normal nozzles NZ1*n* in the first nozzle group NG1 that can eject less visible first liquid LQ1. Therefore, the second specific example makes it possible to know the location of the defective nozzles included in the nozzle group that ejects less visible liquid by visual inspection of the printed object. A first nozzle test pattern TP1 consisting of individual patterns TP1*i*, in which the second liquid LQ2 ejected from a plurality of different color nozzles overlaps on the medium ME0, is printed on the medium ME0. Therefore, the individual patterns TP1*i* can be printed even if some of the plurality of color nozzles are second defective nozzles NZ2*d*. Therefore, the second specific example enables the first nozzle test pattern TP1, which is less affected by the second defective nozzle NZ2*d* in the second nozzle group NG2, to be printed on the medium ME0.

5. THIRD SPECIFIC EXAMPLE

The first nozzle test pattern TP1 formed according to the second specific example may bleed because multiple colored inks overlap on the medium ME0. Therefore, as illustrated in FIGS. 12 and 13, it is conceivable to suppress the bleeding of the first nozzle test pattern TP1 by using only one colored ink to form the first nozzle test pattern TP1.

Figure 13:
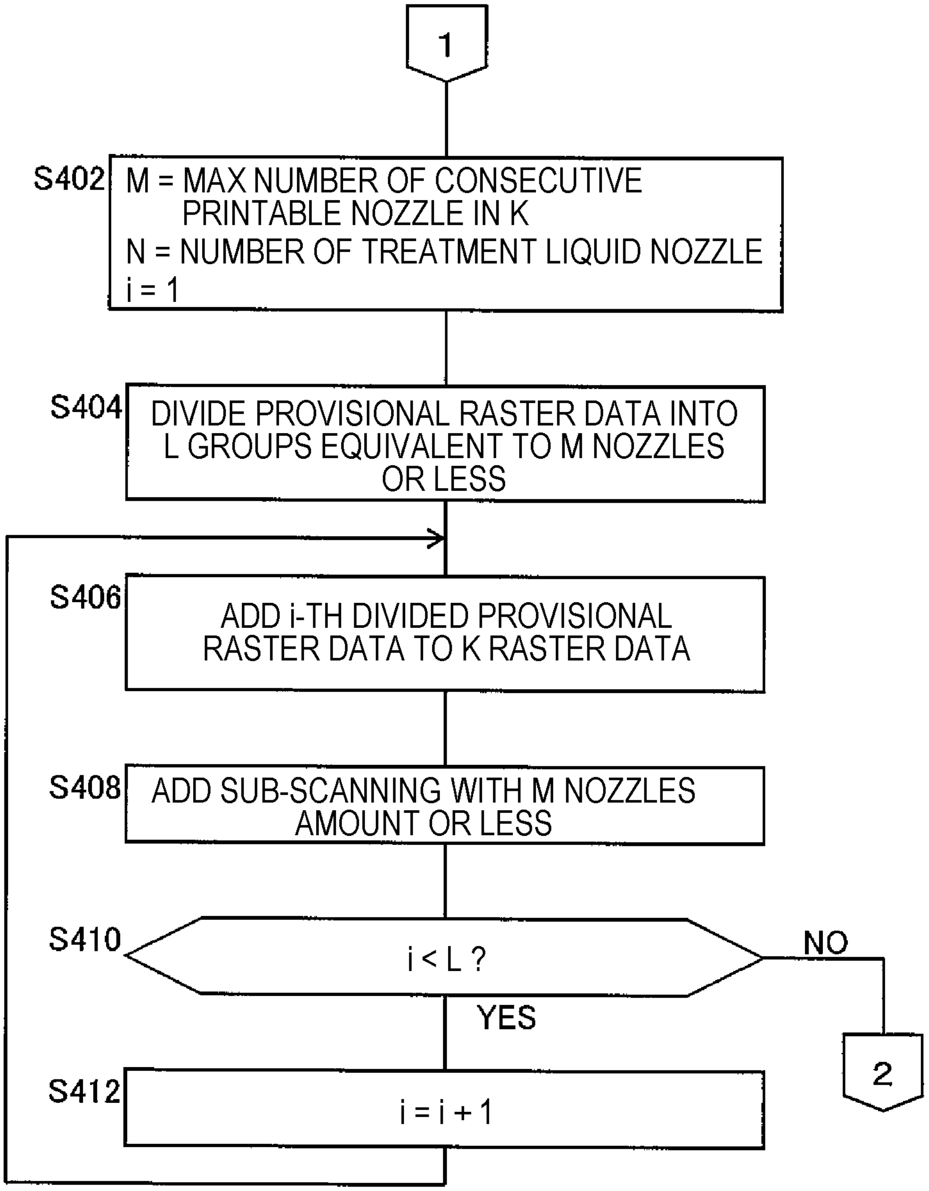
FIG. 13 is a flowchart that schematically illustrates still another example of the nozzle check process.

FIGS. 12 and 13 are flowcharts that schematically illustrate a nozzle check process performed by the controller 10 to form a printed object similar to that illustrated in FIG. 10. Here again, the controller 10 initiates the nozzle check process when the lot of medium ME0 is changed or when the print job is changed. S302 corresponds to the detection step ST1, and S304 to S320 and S402 to S412 correspond to the printing step ST2. Note that the nozzle check process in the third specific example is explained with reference to the first nozzle test pattern TP1 illustrated in FIG. 8, the classification example illustrated in FIG. 9, and also the printed object illustrated in FIG. 10. In the nozzle check process illustrated in FIGS. 12 and 13, the black nozzle array 33K corresponds to the first color nozzle group NG21, the magenta nozzle array 33M corresponds to the second color nozzle group NG22, the cyan nozzle array 33C corresponds to the third color nozzle group NG23, the nozzles 34 of K correspond to the first color nozzles NZ21, the nozzles 34 of M correspond to the second color nozzles NZ22, and the nozzles 34 of C correspond to the third color nozzles NZ23.

When the nozzle check process starts, the controller 10 causes the detection section U2 to perform an all-nozzle inspection process that not only detects the first defective nozzles NZ1*d* in the treatment liquid nozzle array 33P but also the second defective nozzles NZ2*d* in the color nozzle arrays (33K, 33M, 33Y, and 33C) (S302). As explained with reference to FIGS. 4 and 5, the detection section U2 detects whether each nozzle 34 in the entire nozzle array 33 is a normal nozzle (NZ1*n* or NZ2*n*) or a defective nozzle (NZ1*d* or NZ2*d*) based on the detected voltage of the residual vibration of the diaphragm 39. In other words, the detection section U2 detects whether each of the first nozzles NZ1 is a first normal nozzle NZ1*n* or a first defective nozzle NZ1*d* without printing a test pattern on the medium ME0 that shows the ejection state of each of the first nozzles NZ1. The detection section U2 also detects whether each of the second nozzles NZ2 is a second normal nozzle NZ2*n* or a second defective nozzle NZ2*d* without printing the second nozzle test pattern TP2 on the medium ME0. Note that the Y ink is not used to print the simulated first nozzle test pattern TP1 in the nozzle check process illustrated in FIGS. 12 and 13, so the detection section U2 may omit checking each of the nozzles 34 in the yellow nozzle array 33Y.

After the treatment liquid nozzle inspection process, as in S204 illustrated FIG. 11, the controller 10 generates provisional raster data showing the first nozzle test pattern TP1 with individual patterns TP1*i* corresponding to the positions of each of the first normal nozzles NZ1*n* detected by the detection section U2 (S304). As described above, the provisional raster data is data formed and represented by single color dots indicating the simulated first test pattern TP1. Next, as in S206 illustrated in FIG. 11, the controller 10 generates raster data for the second nozzle test pattern TP2, which shows ejection state of each of the second nozzles NZ2 of the color nozzle arrays (33K, 33M, 33Y, and 33C) (S306). As described above, the raster data of the second nozzle test pattern TP2 is data that represents the second nozzle test pattern TP2 as illustrated in FIG. 10, formed by dots.

Next, the controller 10 determines whether the second normal nozzle NZ2*n*, excluding the second defective nozzles NZ2*d* of the plurality of the first color nozzles NZ21 of the black nozzle array 33K, exists at each position corresponding to the first normal nozzles NZ1*n* in the treatment liquid nozzle array 33P (S308). If the second normal nozzles NZ1*n* exist at each position corresponding to the first normal nozzles NZ2*n*, the controller 10 adds the provisional raster data formed in a single color data to the K raster data (S310), and finally performs printing (S320) as in S210 illustrated in FIG. 11 (S320). In this case, the controller 10 causes the second nozzle test patterns TP2 to be printed on the media ME0 with colored inks of each of colors K, M, Y, and C. Also, the controller 10 causes the first nozzle test pattern TP1 to be printed on the medium ME0 with the K ink ejected from the plurality of first color nozzles NZ21. This results in a printed object with the second nozzle test pattern TP2 and, as the information IN0, with the simulated first nozzle test pattern TP1 of K, wherein all individual patterns TP1*i* are indicated in black as illustrated in FIG. 10.

If, in S308, second defective nozzles NZ2*d* exist in any of the black nozzle array 33K at positions corresponding to the first normal nozzles NZ1*n*, then the controller 10 proceeds to S312. In step 312, the controller 10 determines whether the second normal nozzles NZ2*n*, excluding the second defective nozzles NZ2*d* of the plurality of second color nozzles NZ22 of the magenta nozzle array 33M at each position corresponding to the first normal nozzles NZ1*n* in the treatment liquid nozzle array 33P. If second normal nozzles NZ1*n* exist at each position corresponding to the first normal nozzles NZ2*n*, the controller 10 adds the provisional raster data formed in a single color data to the M raster data (S314), and finally performs printing (S320). In this case, the controller 10 causes the second nozzle test patterns TP2 to be printed on the media ME0 with colored inks of each of colors K, M, Y, and C. Also, the controller 10 causes the first nozzle test pattern TP1 to be printed on the medium ME0 with the M ink ejected from the plurality of second color nozzles NZ22. This results in a printed object with the second nozzle test pattern TP2 and, as the information IN0, with the simulated first nozzle test pattern TP1 of M, wherein all individual patterns TP1*i* are indicated in magenta as illustrated in FIG. 10.

If second defective nozzles NZ2*d* exist in any of the magenta nozzle array 33M at the positions corresponding to the first normal nozzles NZ1*n* in S312, the controller 10 proceeds to S316. In step 316, the controller 10 determines whether a second normal nozzle NZ2*n*, excluding the second defective nozzle NZ2*d* of the plurality of third color nozzles NZ23 of the cyan nozzle array 33C exists at each position corresponding to the first normal nozzles NZ1*n* in the treatment liquid nozzle array 33P. If the second normal nozzles NZ1*n* exist at each position corresponding to the first normal nozzles NZ2*n*, the controller 10 adds the provisional raster data formed in a single color data to the C raster data (S318), and finally performs printing (S320). In this case, the controller 10 causes the second nozzle test patterns TP2 to be printed on the media ME0 with colored inks of each of colors K, M, Y, and C. With respect to the simulated first nozzle test pattern TP1, the controller 10 causes the first nozzle test pattern TP1 to be printed on the medium ME0 with the C ink ejected from the plurality of third color nozzles NZ23. This results in a printed object with the second nozzle test pattern TP2 and, as the information IN0, with the simulated first nozzle test pattern TP1 of C, wherein all individual patterns TP1*i* are indicated in cyan as illustrated in FIG. 10.

If the second defective nozzles NZ2*d* exist in any of the cyan nozzle array 33C at the positions corresponding to the first normal nozzles NZ1*n* in S316, the controller 10 proceeds to S402 as illustrated in FIG. 13. The reason why the simulated first nozzle test pattern TP1 of Y is not printed in the third specific example is that the K, M, or C test pattern is easier to identify than the Y test pattern on the medium ME0. The case in which S402 and subsequent processes are performed is when it is not possible to form the first nozzle test pattern TP1 with K, M, or C inks in a single main-scanning. Therefore, it is necessary to perform plurality of main-scanning with sub-scanning in between main-scannings. The example illustrated in FIG. 13 shows that of the nozzles #1 to #n included in the black nozzle array 33K, M number of second normal nozzles NZ2*n* are used to print the first nozzle test pattern TP1, wherein M is the longest, consecutive number of nozzles.

In S402, the controller 10 sets the variable M to the maximum number of consecutive printable nozzles in K, sets variable N to the total number of nozzles of the treatment liquid nozzle array 33P, and sets variable i to 1. The maximum number of consecutive printable nozzles in K is a number of nozzles of the second normal nozzles NZ2*n* whose nozzle numbers are consecutive and whose number of consecutive nozzles is the largest, amongst the nozzles #1 to #n included in the black nozzle array 33K. The total number of nozzles in the treatment liquid nozzle array 33P is the number of nozzles n shown in FIG. 9. Next, the controller 10 divides the provisional raster data showing the first nozzle test pattern TP1 of the treatment liquid nozzle array 33P into L groups, which are equivalent to M nozzles or less (S404). The division number L is L=N/M if N/M is an integer or, if N/M is not an integer, it is an integer rounded up to the decimal point of N/M. If i<L, the divided provisional raster data is equivalent to M nozzles, and when i=L, the divided provisional raster data is equivalent to the remaining M nozzles or less.

Next, the controller 10 adds the i-th divided provisional raster data, which is consisting of a single color, to the K raster data (S406), and adds a sub-scanning with a transport amount of M nozzles or less (S408). The process in S408 may simply add a sub-scanning for M nozzles amount, or it may add a sub-scanning for less than M nozzles amount when the Lth divided provisional raster data is less than M nozzles and i=L.

Next, the controller 10 determines whether the variable i is less than the division number L (S410). If the variable i is less than the division number L, the controller 10 increases the variable i by 1 (S412), and returns to S406. This means that all the divided provisional raster data with the division number L is added to the K raster data. On the other hand, if the variable i is equal to or higher than the division number L in S410, the controller 10 proceeds to S320 illustrated in FIG. 12 to perform printing. In this case, the controller 10 causes the second nozzle test patterns TP2 to be printed on the media ME0 with colored inks of each of colors K, M, Y, and C. Also, the controller 10 causes the first nozzle test pattern TP1 to be printed on the medium ME0 with the K ink ejected from the plurality of first color nozzles NZ21. This results in a printed object with the second nozzle test pattern TP2 and, as the information IN0, with the simulated first nozzle test pattern TP1 of K, wherein all individual patterns TP1*i* are indicated in black as illustrated in FIG. 10.

As described above, the third specific example also makes it possible to know the location of the defective nozzles in the nozzle group that ejects liquid that is difficult to see by visual inspection of the printed object. In addition, since the colored inks ejected from multiple color nozzles do not overlap on the media ME0, bleeding of the simulated first nozzle test pattern TP1 is suppressed. Therefore, the third specific example can suppress bleeding of the simulated test pattern consisting of the individual patterns corresponding to the positions of each of the normal nozzles in the nozzle group that eject the hard-to-see liquid. Note that as long as the individual patterns TP1*i* corresponding to the positions of each of the first normal nozzles NZ1*n* in the treatment liquid nozzle array 33P are printed on the medium ME0 with K ink, the processes from S402 to S412 can be changed in various ways. For example, the controller 10 may cause the individual patterns corresponding to the positions of the second normal nozzles NZ2*n* in the black nozzle array 33K, among the individual patterns TP1*i* corresponding to the positions of all the first normal nozzles NZ1*n*, to be formed in the first main-scanning. Next, the controller 10 may perform sub-scanning so that the unformed individual patterns TP1*i* are formed by K ink, which is ejected from the second normal nozzles NZ2*n* in the black nozzle array 33K, and then cause it to be formed in another main-scanning.

6. FOURTH SPECIFIC EXAMPLE

Figure 14:
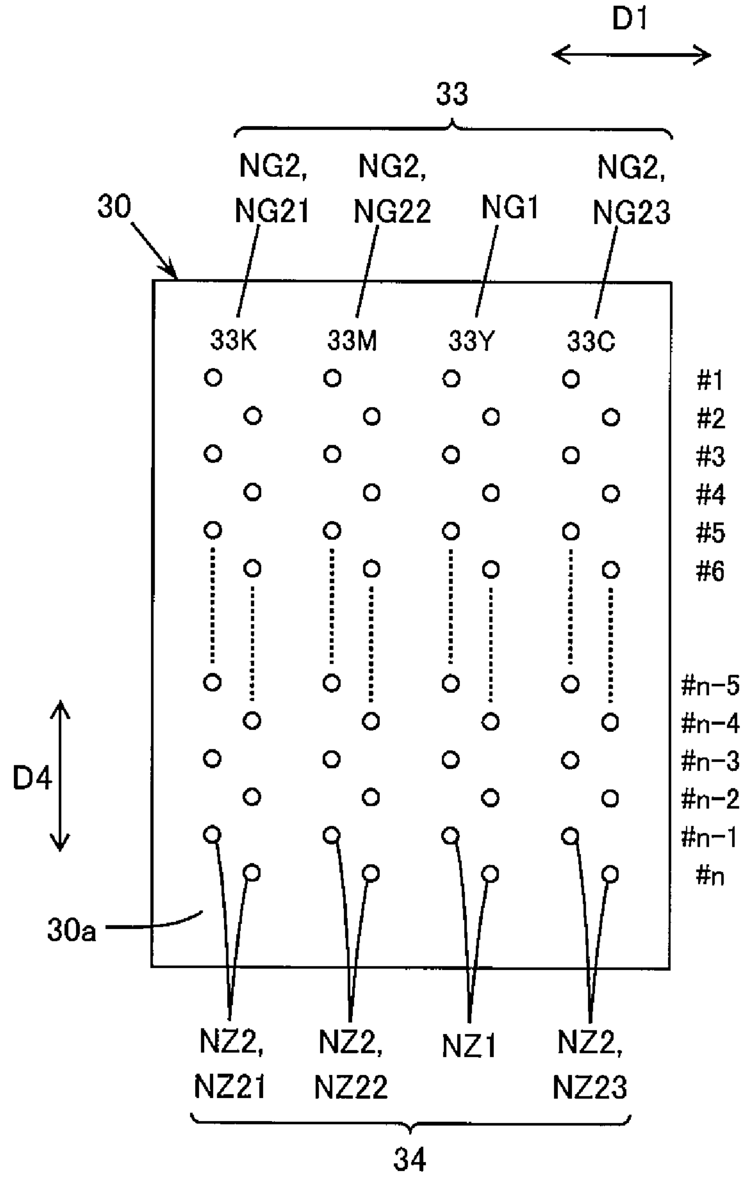
FIG. 14 is a schematic illustration of another example of nozzle groups and nozzle classifications.

As illustrated in FIG. 14, the yellow nozzle array 33Y, which is capable of ejecting the less visible second liquid LQ2 onto medium ME0, may be the first nozzle group NG1. FIG. 14 schematically illustrates nozzle groups and classification of nozzles to explain the fourth specific example. The basic color of the medium ME0 usually has high brightness. The Y ink on the medium ME0 is relatively high in brightness, so there is little difference in brightness between the Y ink and the basic color of the medium ME0 is small, resulting in low visibility. Therefore, in this specific example, if the yellow nozzle array 33Y corresponds to the first nozzle group NG1, the information IN0 of the defective nozzles in the yellow nozzle array 33Y will be clearly indicated on the printed object.

The print head 30 illustrated in FIG. 14 has a black nozzle array 33K that can eject K ink, a magenta nozzle array 33M that can eject M ink, a yellow nozzle array 33Y that can eject Y ink, and a cyan nozzle array 33C that can eject C ink. Here, the Y ink is an example of the first liquid LQ1. The C ink, the M ink, and the K ink are examples of the second liquid LQ2. The nozzles 34 in the yellow nozzle array 33Y are examples of the first nozzles NZ1. The yellow nozzle array 33Y is an example of the first nozzle group NG1. The nozzles 34 in the remaining nozzle arrays (33K, 33M, and 33C) are examples of the second nozzles NZ2. The nozzle arrays 33K, 33M, and 33C are examples of the second nozzle group NG2.

The information IN0 regarding the first defective nozzles NZ1*d* detected by the detection section U2 may be printed according to the nozzle check process in FIG. 7 in K, M, or C ink as the number of defective nozzles as illustrated in FIG. 6. The information IN0 may be printed according to the nozzle check process shown in FIG. 11 in K, M, and C ink as the first nozzle test pattern TP1 as illustrated in FIG. 10. Furthermore, the information IN0 may be printed according to the nozzle check process illustrated in FIGS. 12 and 13 in K, M, or C ink as the first nozzle test pattern TP1.

By viewing the printed object, the user can know not only the highly visible second nozzle test pattern TP2 with the second liquid LQ2, but also the information IN0 of the first defective nozzle NZ1*d* of the yellow nozzle array 33Y that can eject Y ink, which is difficult to be seen in the test pattern. Note that the print head 30 shown in FIG. 14 may have the treatment liquid nozzle array 33P. In this case, the treatment liquid nozzle array 33P and the yellow nozzle array 33Y may be assigned to the first nozzle group NG1.

7. MODIFICATIONS

Various modifications can be made to this disclosure. For example, the color combination of liquids other than the treatment liquid is not limited to C, M, Y, and K and may include orange, green, light cyan which has a lower density than C, light magenta which has a lower density than M, dark yellow which has a higher density than Y, light black which has a lower density than K, and the like. Of course, this technology can also be applied when the printing device 1 does not use any of the C, M, Y, and K liquids. The low visibility first liquid LQ1 is not limited to the treatment liquid or to Y ink, and can be light cyan ink, light magenta ink, light black ink, or the like. The highly visible second liquid LQ2 is not limited to pigment ink, and dye inks, and the like may also be used. The printer 2 is not limited to a textile printing apparatus, but can also be an inkjet printer that prints on paper or other medium. The printer 2 is not limited to a serial printer and can also be a line printer with nozzle arrays of nozzles arranged over almost the entire width direction of the medium.

The detection section U2 that detects defective nozzles is not limited to the nozzle ejection state detection section that uses the detection voltage of the residual vibration of the diaphragm. For example, the detection section U2 may capture images of the nozzle surface 30*a* of the print head 30 with a camera and determine whether each nozzle 34 is a normal nozzle or a defective nozzle based on the captured image and the reference image of the nozzle surface.

The entity that performs the process described above is not limited to the CPU, and can also be an electronic component other than the CPU, such as an ASIC. Of course, a plurality of CPUs may perform the above described processes in cooperation with each other, or a CPU and another electronic component (for example, an ASIC) may perform the above described processes in cooperation with each other. The above processes can be modified as needed, for example, by changing the order of the processes. For example, in the process illustrated in FIG. 7, the process of S108, which generates the raster data for the second nozzle test pattern TP2, can be performed before any of the processes of S102, S104, and S106.

Some of the above processes may also be performed by the host device HO1. In this case, the combination of the controller 10 and the host device HO1 is as example of control section U1, and the combination of the printer 2 and the host device HO1 is an example of the printing device 1.

8. CONCLUSION

As described above, this disclosure provides a printing device and other technology by which, in various ways, information regarding defective nozzles in a nozzle group that ejects liquid that is difficult to see in a test pattern, can be easily indicated on a printed object together with a test pattern of easily visible liquid. As a matter of course, the above described basic operations and effects can be obtained even with a technology consisting only of the constituent elements according to the independent claims. In addition, it is possible to implement a configuration in which each configuration disclosed in the above described examples is replaced with each other or a combination thereof is changed, a configuration in which each configuration disclosed in a known technology and the above described examples is replaced with each other or a combination thereof is changed, and the like. The present disclosure may include these configurations.

What is claimed is:

1. A printing device comprising:

a print head having a first nozzle group including a plurality of first nozzles configured to eject a first liquid onto a medium and a second nozzle group including a plurality of second nozzles configured to eject a second liquid, which is more visible than the first liquid, onto the medium;

a control section that controls the ejection of the first liquid and the second liquid from the print head; and a detection section configured to detect a first defective nozzle, which is an ejection failure of the first nozzle group, without printing a test pattern indicating ejection state of each of the first nozzles on the medium, wherein the control section controls to cause a second nozzle test pattern, which indicates ejection state of each of the second nozzles, to be printed on the medium by using the second liquid and to cause information regarding the first defective nozzle detected by the detection section to be printed on the medium by using the second liquid, and the control section controls to cause a numerical value indicating a number of the first defective nozzles that were detected by the detection section to be printed as the information on the medium by using the second liquid.

2. The printing device according to claim 1, wherein the control section controls to cause a first nozzle test pattern having individual patterns corresponding to positions of each of first normal nozzles, excluding the first defective nozzle, of the plurality of first nozzles, to be printed on the medium by using the second liquid.

3. The printing device according to claim 2, wherein the print head has, as the second nozzle group, a first color nozzle group including a plurality of first color nozzles and a second color nozzle group including a plurality of second color nozzles and when printing the individual patterns corresponding to the positions of each of the first normal nozzles on the medium, the control section controls to cause the second liquid ejected from the first color nozzles and the second liquid ejected from the second color nozzles to overlap on the medium.

4. A printing device comprising:

a print head having a first nozzle group including a plurality of first nozzles configured to eject a first liquid onto a medium and a second nozzle group including a plurality of second nozzles configured to eject a second liquid, which is more visible than the first liquid, onto the medium:

a control section that controls the ejection of the first liquid and the second liquid from the print head; and a detection section configured to detect a first defective nozzle, which is an ejection failure of the first nozzle group, without printing a test pattern indicating ejection state of each of the first nozzles on the medium, wherein the control section controls to cause a second nozzle test pattern, which indicates ejection state of each of the second nozzles, to be printed on the medium by using the second liquid and to cause information regarding the first defective nozzle detected by the detection section to be printed on the medium by using the second liquid, the control section controls to cause a first nozzle test pattern having individual patterns corresponding to positions of each of first normal nozzles, excluding the first defective nozzle, of the plurality of first nozzles, to be printed on the medium by using the second liquid, the print head has, as the second nozzle group, a first color nozzle group including a plurality of first color nozzles and a second color nozzle group including a plurality of second color nozzles, the detection section is configured to detect a second defective nozzle, which is an ejection failure of the first color nozzle group, without printing the second nozzle test pattern on the medium, and the control section when second normal nozzles excluding the second defective nozzle exist among the plurality of the first color nozzles, at positions corresponding to the first normal nozzles, controls to cause the first nozzle test pattern to be printed on the medium by using the second liquid ejected from the plurality of the first color nozzles and when the second defective nozzle included in the first color nozzle group exists at any position corresponding to the first normal nozzles, controls to cause the first nozzle test pattern to be printed on the medium by using the second liquid ejected from the plurality of the second color nozzles.

5. A printing method for printing by changing the relative positional relationship between a medium and a print head, the print head having a first nozzle group including a plurality of first nozzles configured to eject a first liquid onto a medium and a second nozzle group including a plurality of second nozzles configured to eject a second liquid, which is more visible than the first liquid, onto the medium, the printing method comprising:

a detection step of detecting a first defective nozzle, which is an ejection failure of the first nozzle group, without printing a test pattern indicating ejection state of each of the first nozzles on the medium, a printing step of printing a second nozzle test pattern, which indicates ejection state of each of the second nozzles, to be printed on the medium by using the second liquid and of printing information regarding the first defective nozzle detected by the detection step to be printed on the medium by using the second liquid, wherein the printing step includes printing a numerical value indicating a number of the first defective nozzles that were detected by the detection step as the information on the medium by using the second liquid.

* * * * *